(12) United States Patent
Slutzky et al.

(10) Patent No.: US 6,876,321 B1
(45) Date of Patent: Apr. 5, 2005

(54) PULSE DESCRIPTOR WORD COLLECTOR

(75) Inventors: Barry P. Slutzky, Williams, IN (US); Andrew W. Kluender, Mitchell, IN (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/774,643

(22) Filed: Feb. 6, 2004

(51) Int. Cl.$^7$ .............................................. G01S 13/00
(52) U.S. Cl. ............................ 342/13; 342/14; 342/20; 342/89; 342/175; 342/195
(58) Field of Search ............................... 342/13–20, 44, 342/89–103, 175, 190, 192–196

(56) References Cited

U.S. PATENT DOCUMENTS

| | | | |
|---|---|---|---|
| 4,025,920 A | 5/1977 | Reitboeck et al. | |
| 4,145,691 A | 3/1979 | Freeling et al. | |
| 4,217,580 A | 8/1980 | Lowenschuss | |
| 4,713,662 A | 12/1987 | Wiegand | 342/13 |
| 4,721,958 A * | 1/1988 | Jenkin | 342/13 |
| 4,743,905 A | 5/1988 | Wiegand | 342/14 |
| 4,879,561 A | 11/1989 | Inkol | 342/195 |
| 4,885,587 A | 12/1989 | Wiegand et al. | |
| 4,891,646 A | 1/1990 | Wiegand | 342/15 |
| 4,928,104 A | 5/1990 | Schaffer | 342/15 |
| 5,032,839 A | 7/1991 | Even-Or | 342/15 |
| 5,063,385 A * | 11/1991 | Caschera | 342/13 |
| 5,091,917 A * | 2/1992 | Udd et al. | 342/44 |
| 5,323,161 A | 6/1994 | Gailer et al. | 342/13 |
| 5,672,843 A | 9/1997 | Evans et al. | |
| 5,834,680 A | 11/1998 | Nielson et al. | |
| 5,945,627 A | 8/1999 | Arpin et al. | |
| 6,043,771 A * | 3/2000 | Clark et al. | 342/13 |
| 6,085,077 A * | 7/2000 | Fields et al. | 342/13 |
| 6,113,713 A | 9/2000 | Blomquist | |
| 6,241,281 B1 | 6/2001 | Hinshaw et al. | |

* cited by examiner

Primary Examiner—Bernarr E. Gregory
(74) Attorney, Agent, or Firm—Mark Homer

(57) ABSTRACT

A pulse descriptor word (PDW) collector, including an extractor coupled to a computer, for passively collecting radio frequency (RF) data received by an electronic surveillance system (ESS). It is integrated into the ESS after a receiver (which converts RF pulse data to digitized PDWs) and parrallel to a presorter. Using two RAM circuits, the extractor forms a read/write loop to ensure that no PDWs are lost in the collection process. The extractor simultaneously writes onto one RAM while reading from the other RAM to the computer. The read/write functions of the RAMs are switched at predetermined interrupts. Collected data is stored on the computer hard drive. The computer controls the entire collection process by using data management software, graphical user interface software and sequencing software. Stored data is available on demand for analysis and is used to monitor, assess, and update the threat identification capabilities of the particular ES system.

12 Claims, 48 Drawing Sheets

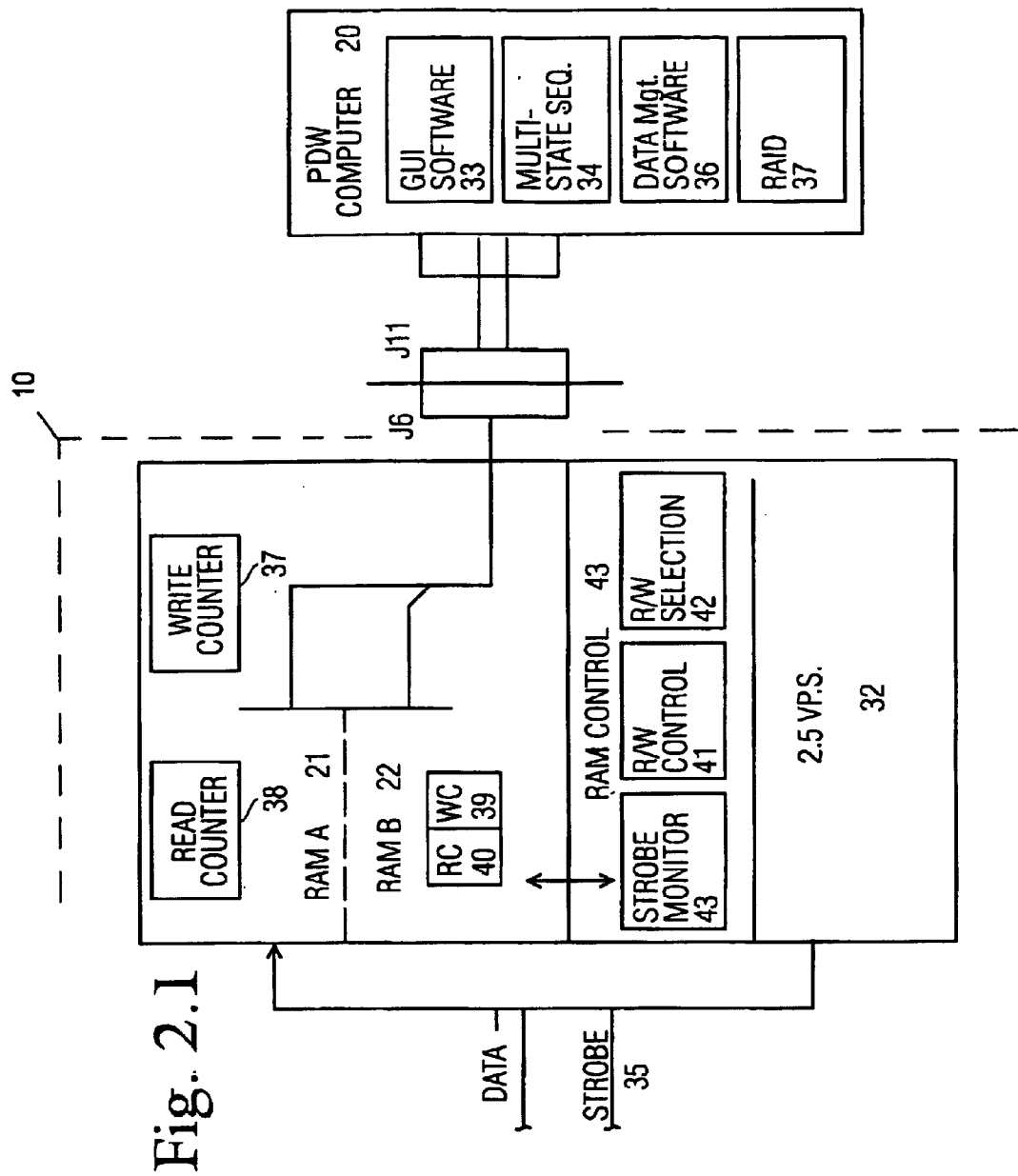
Fig. 2.1

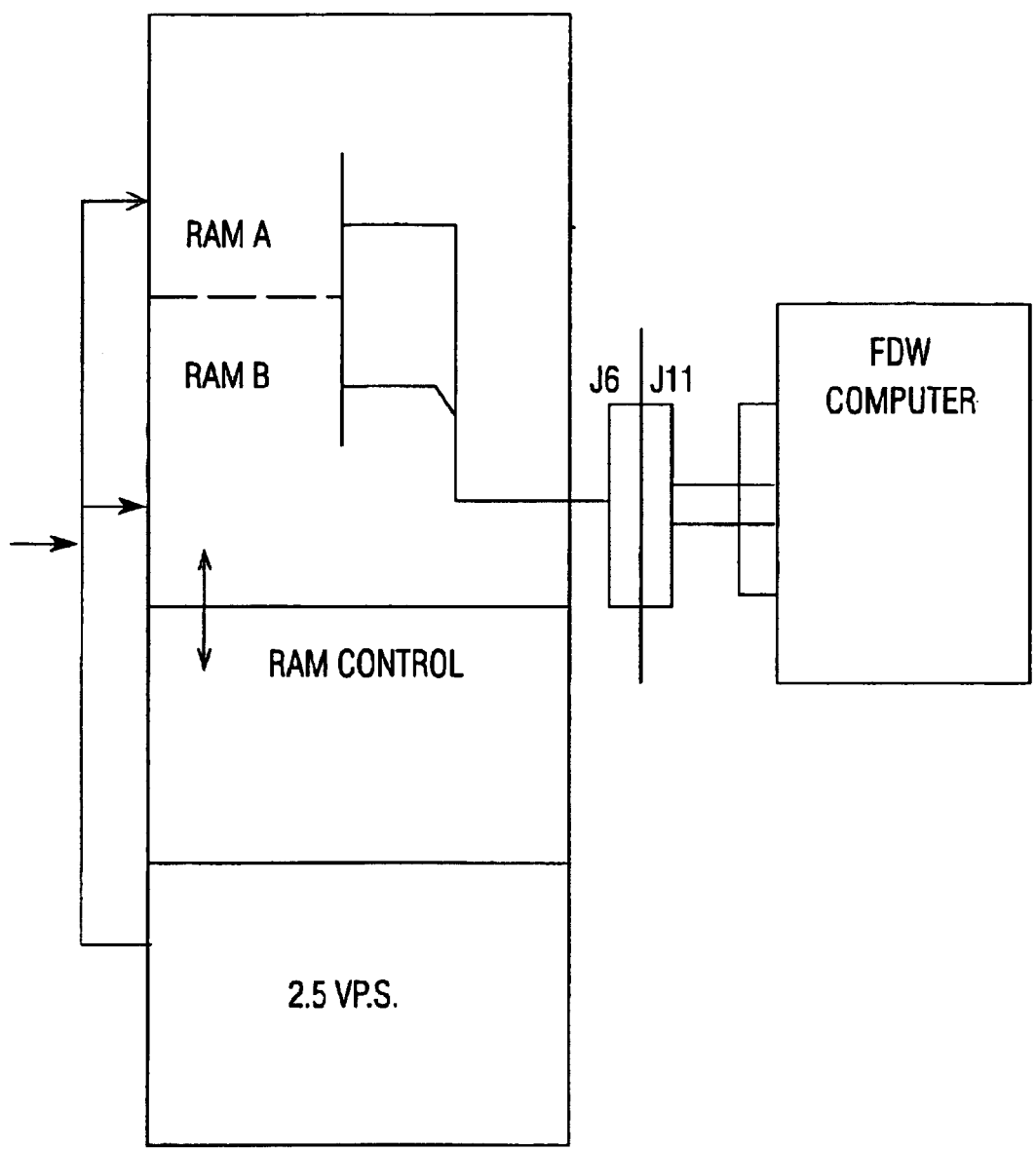
Fig. 3.1

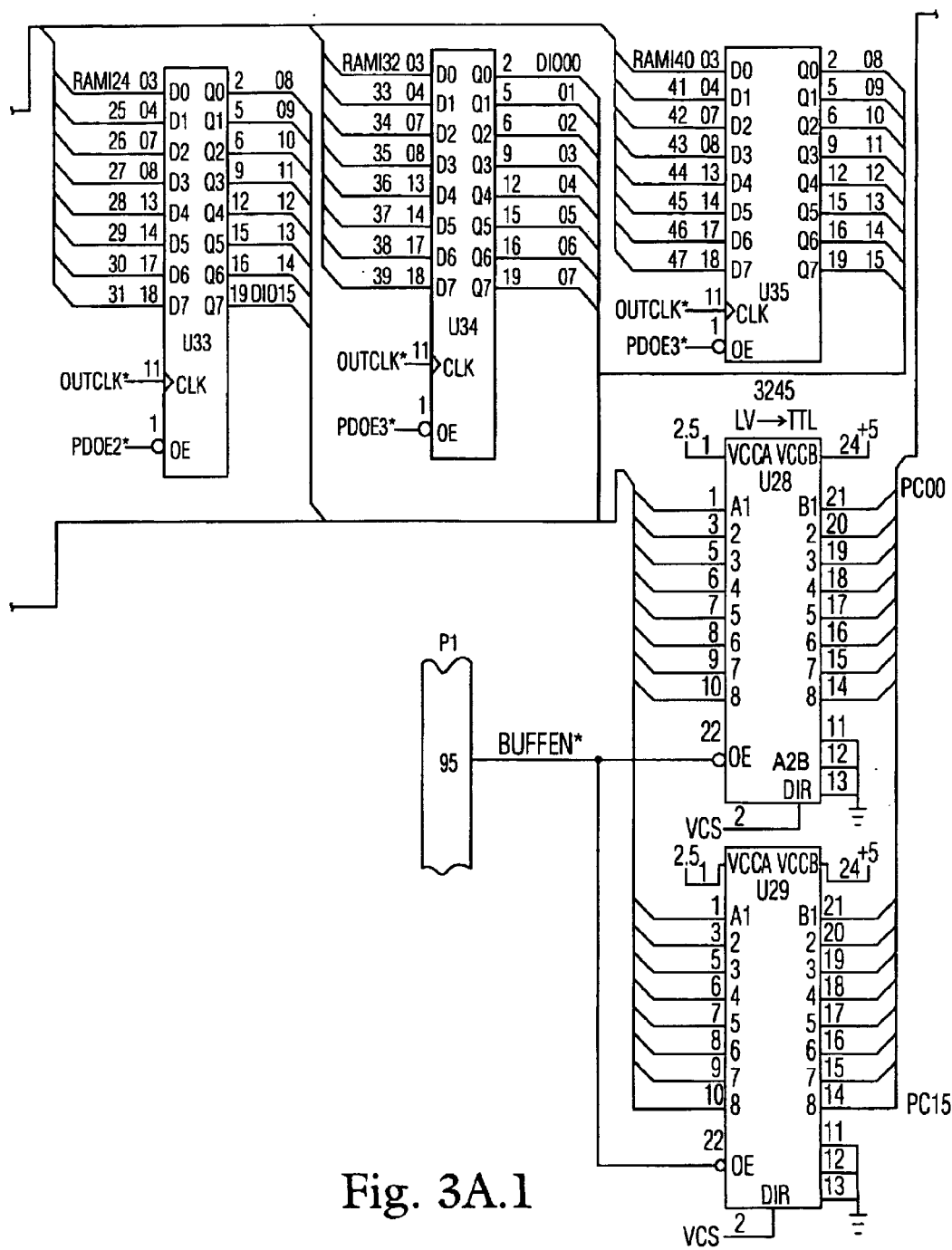
Fig. 3A.1

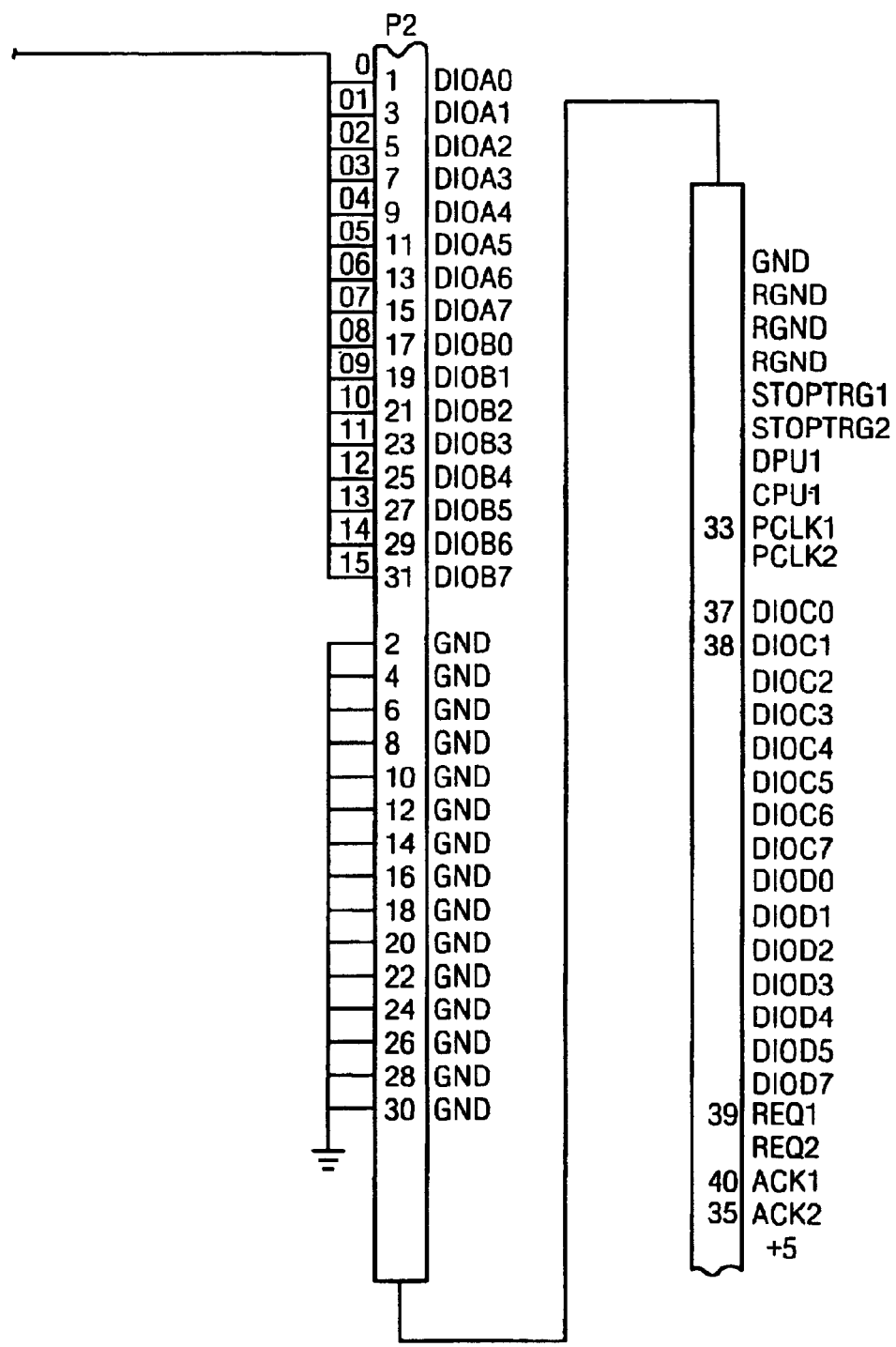
Fig. 3A.2

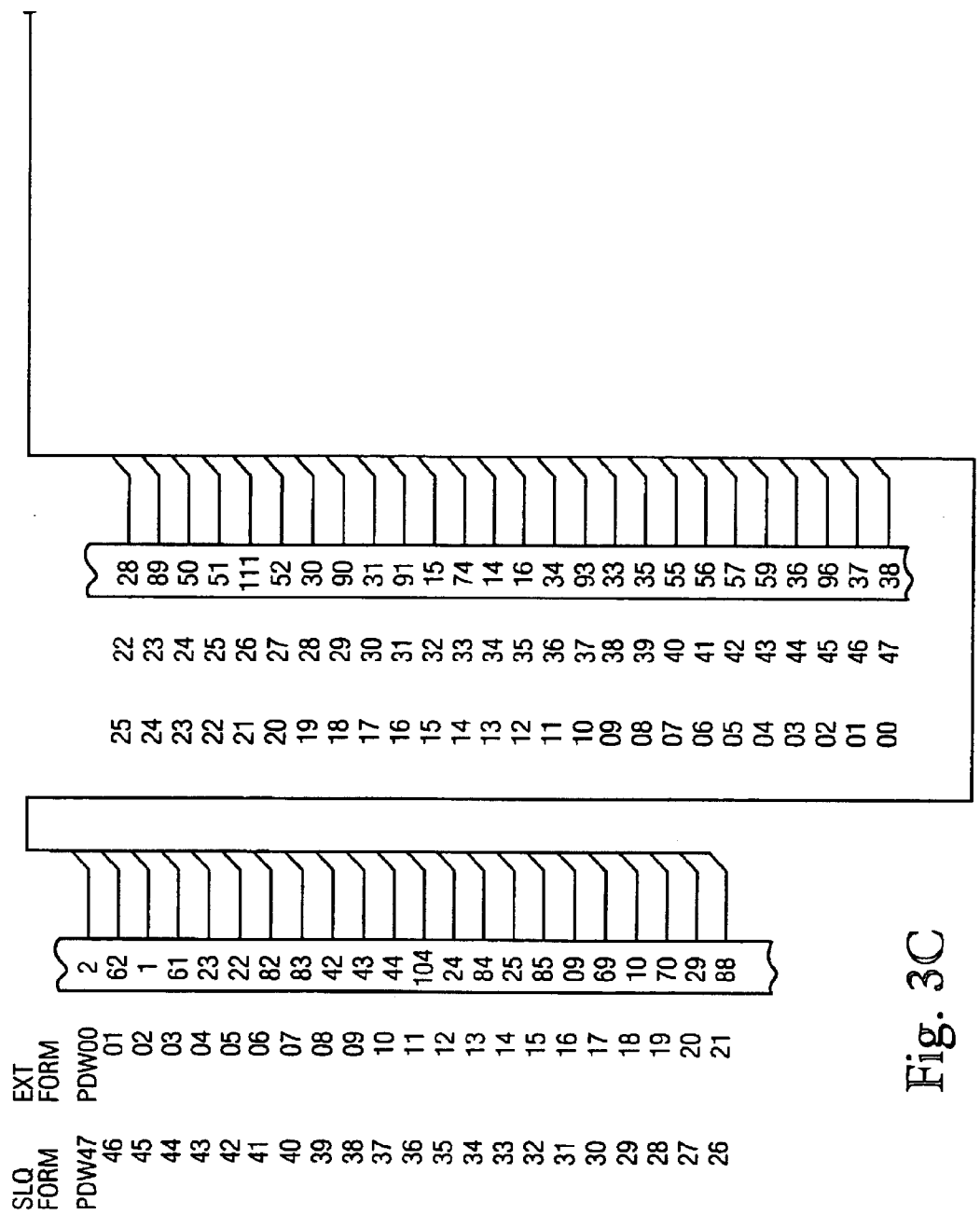

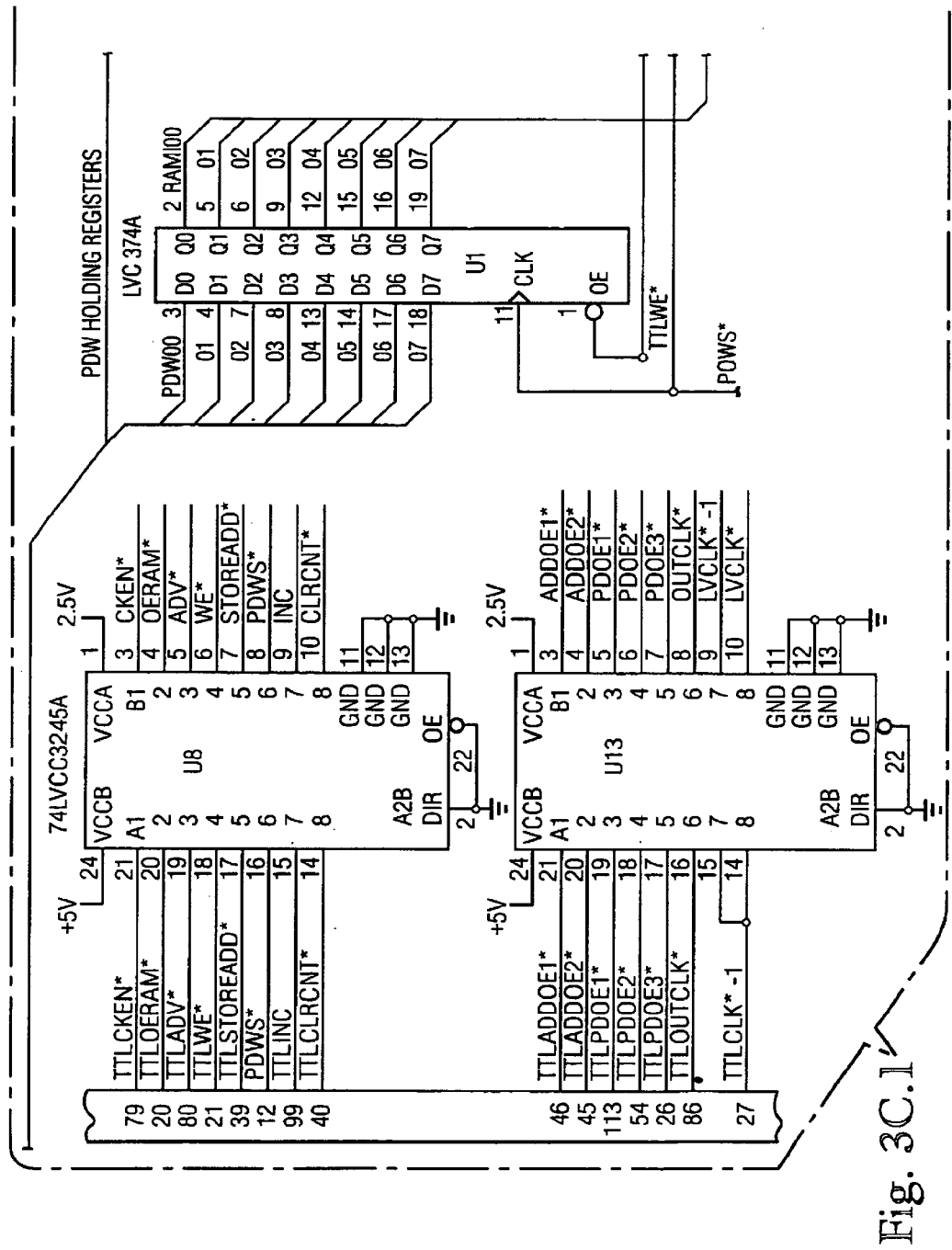
Fig. 3C.1

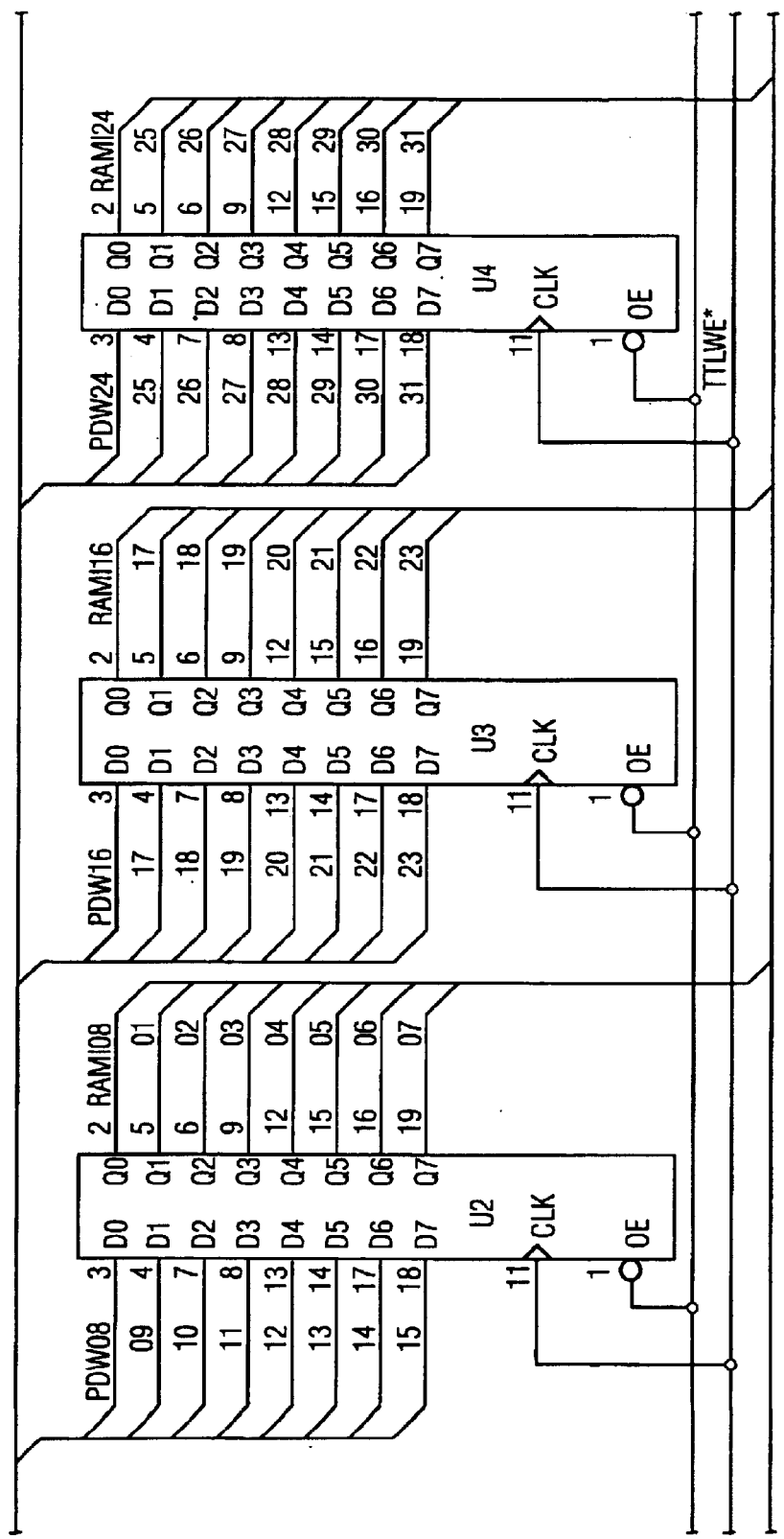
Fig. 3C.2

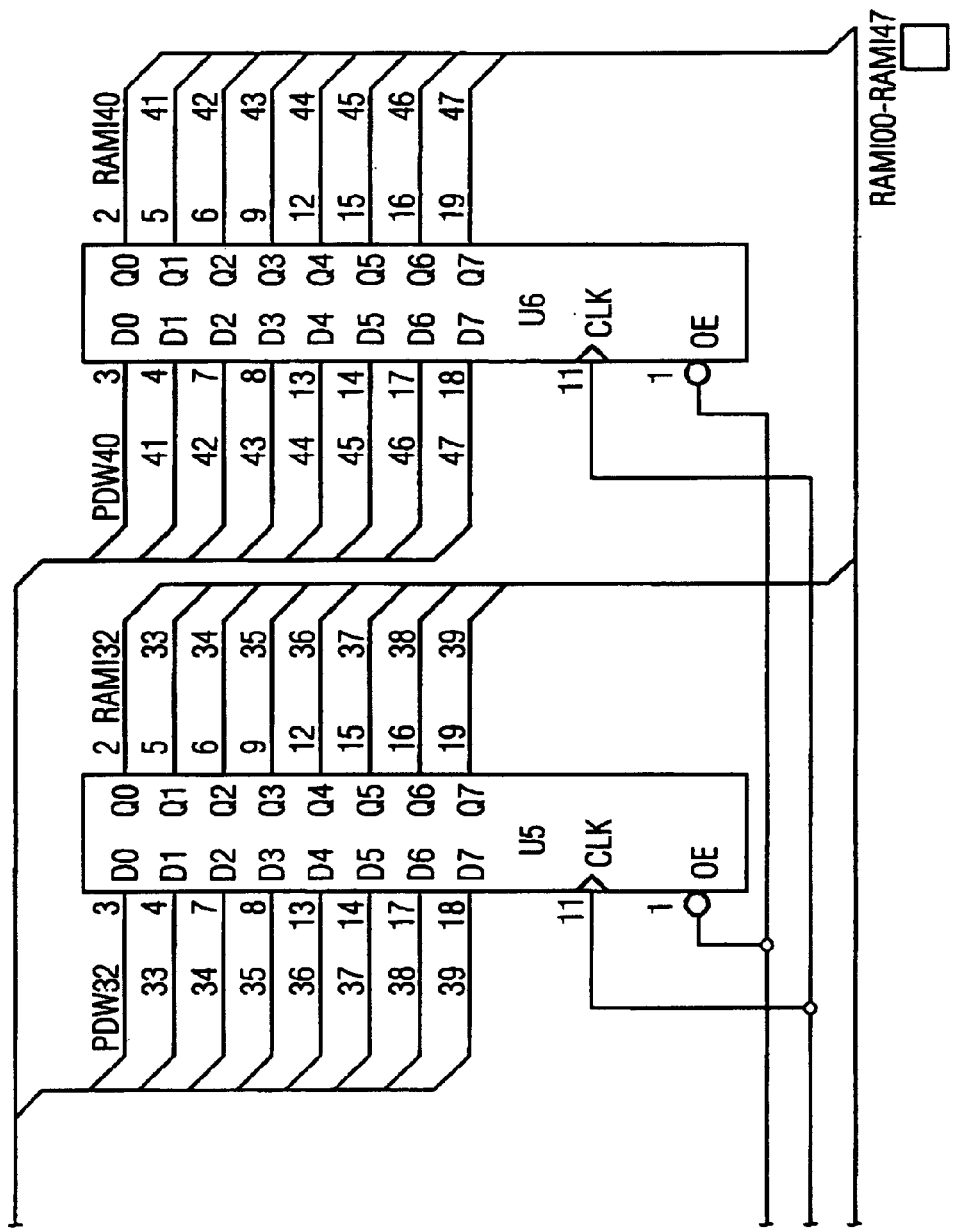
Fig. 3C.3

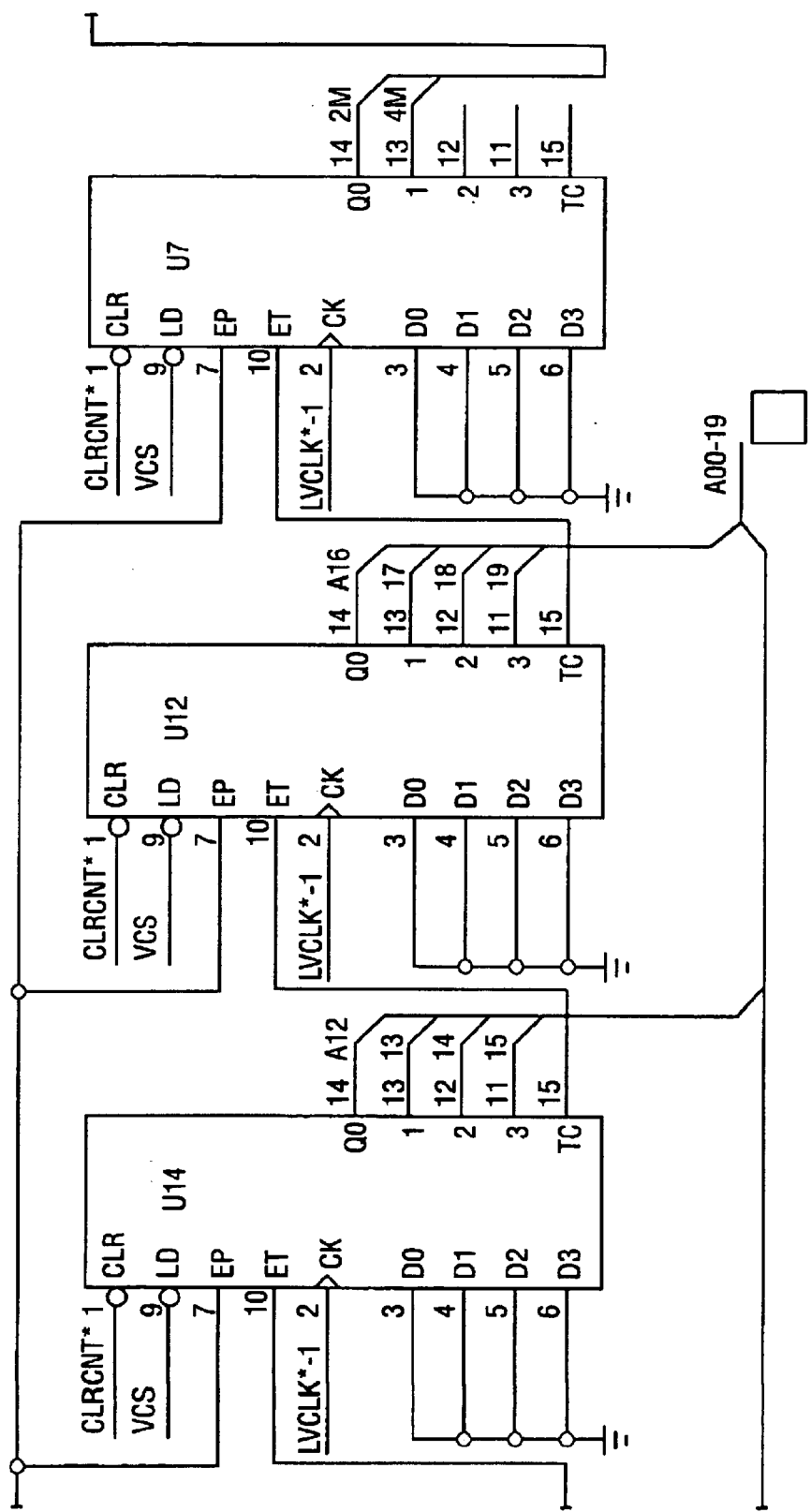
Fig. 3D.1

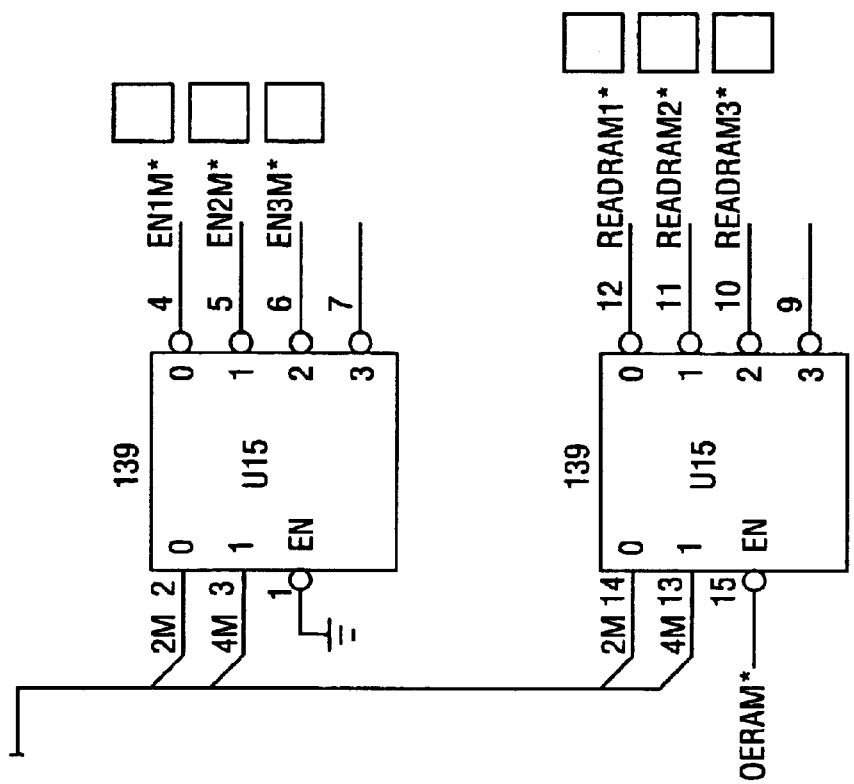
Fig. 3D.2

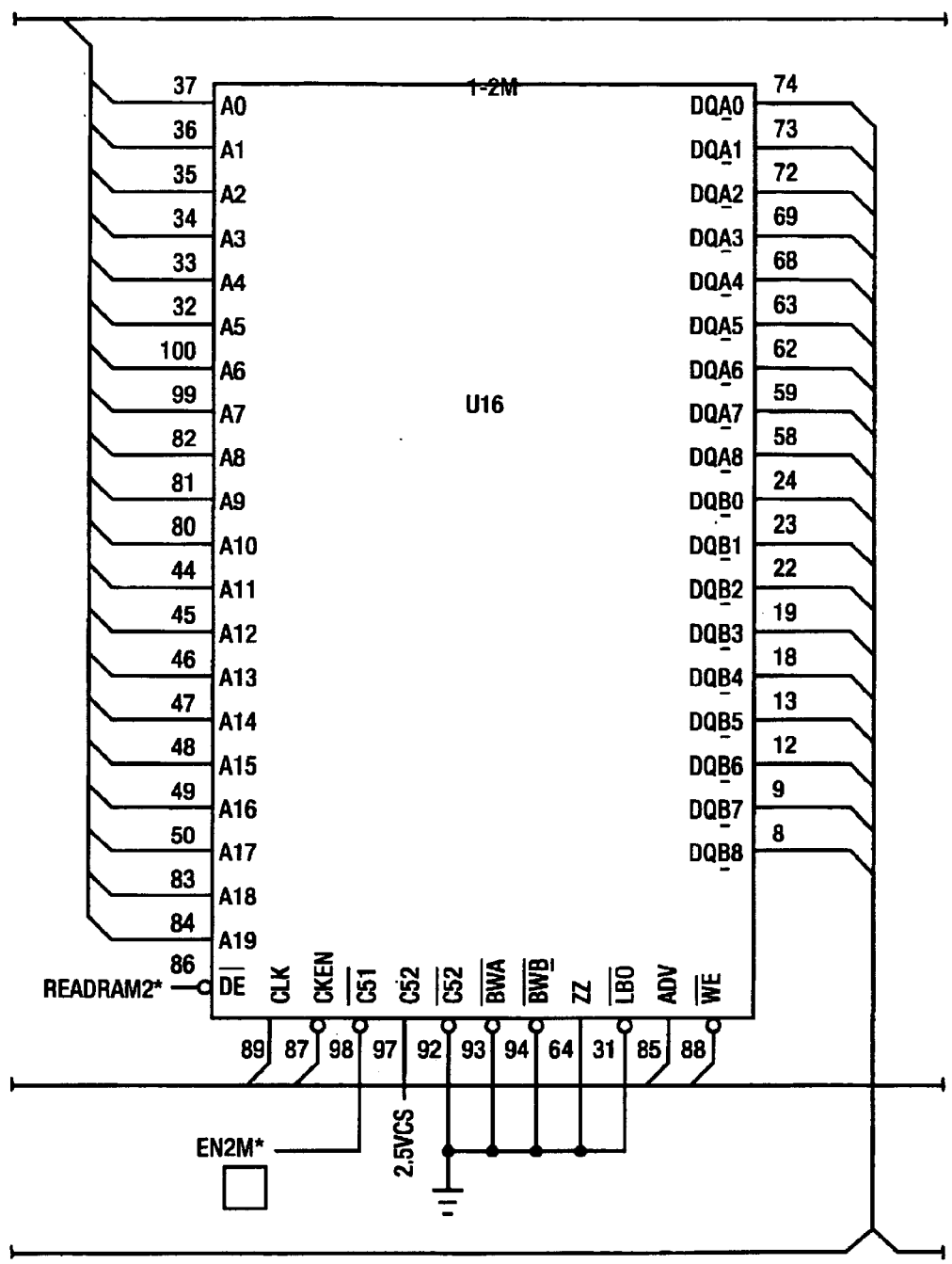
Fig. 3E.1

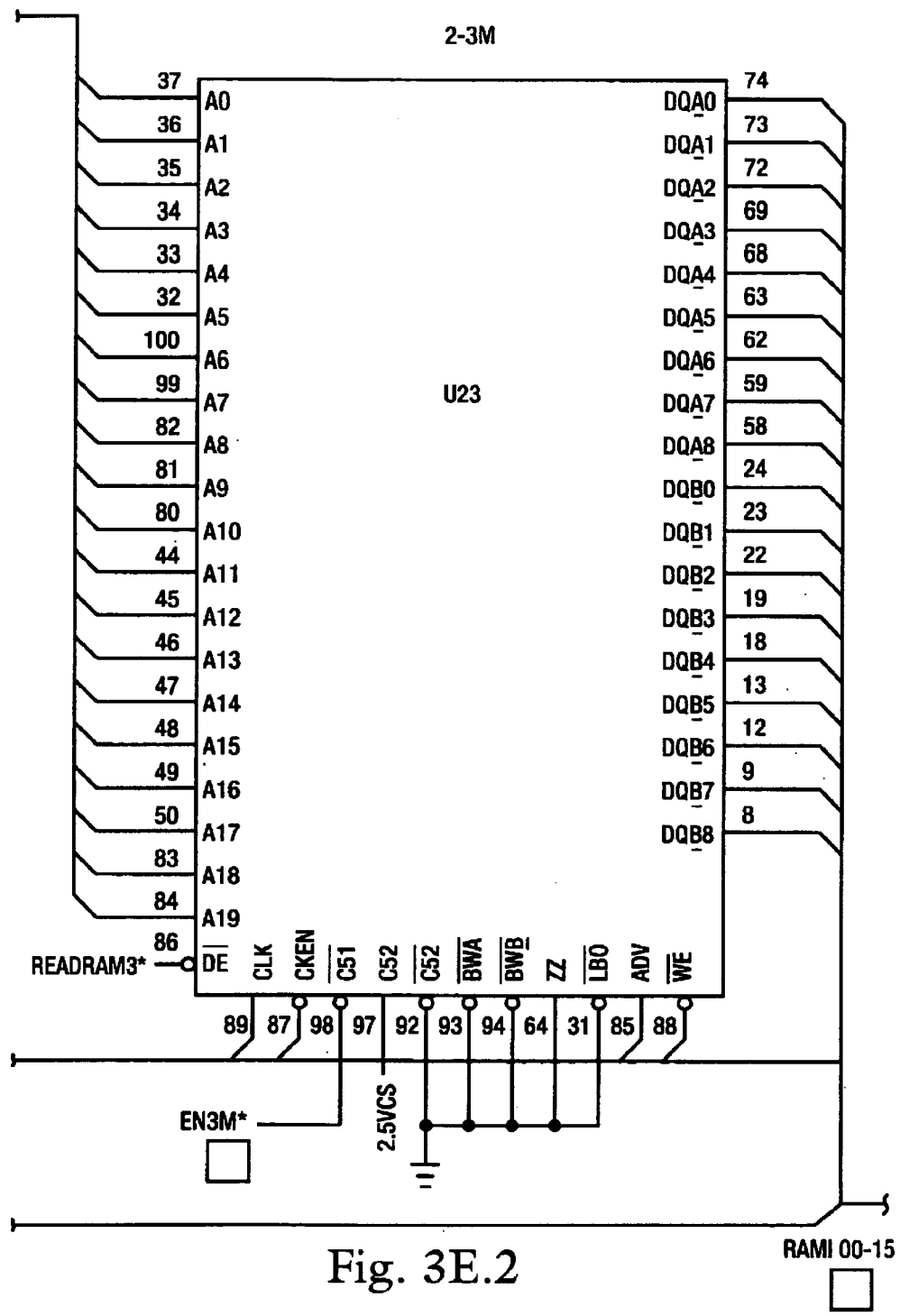
Fig. 3E.2

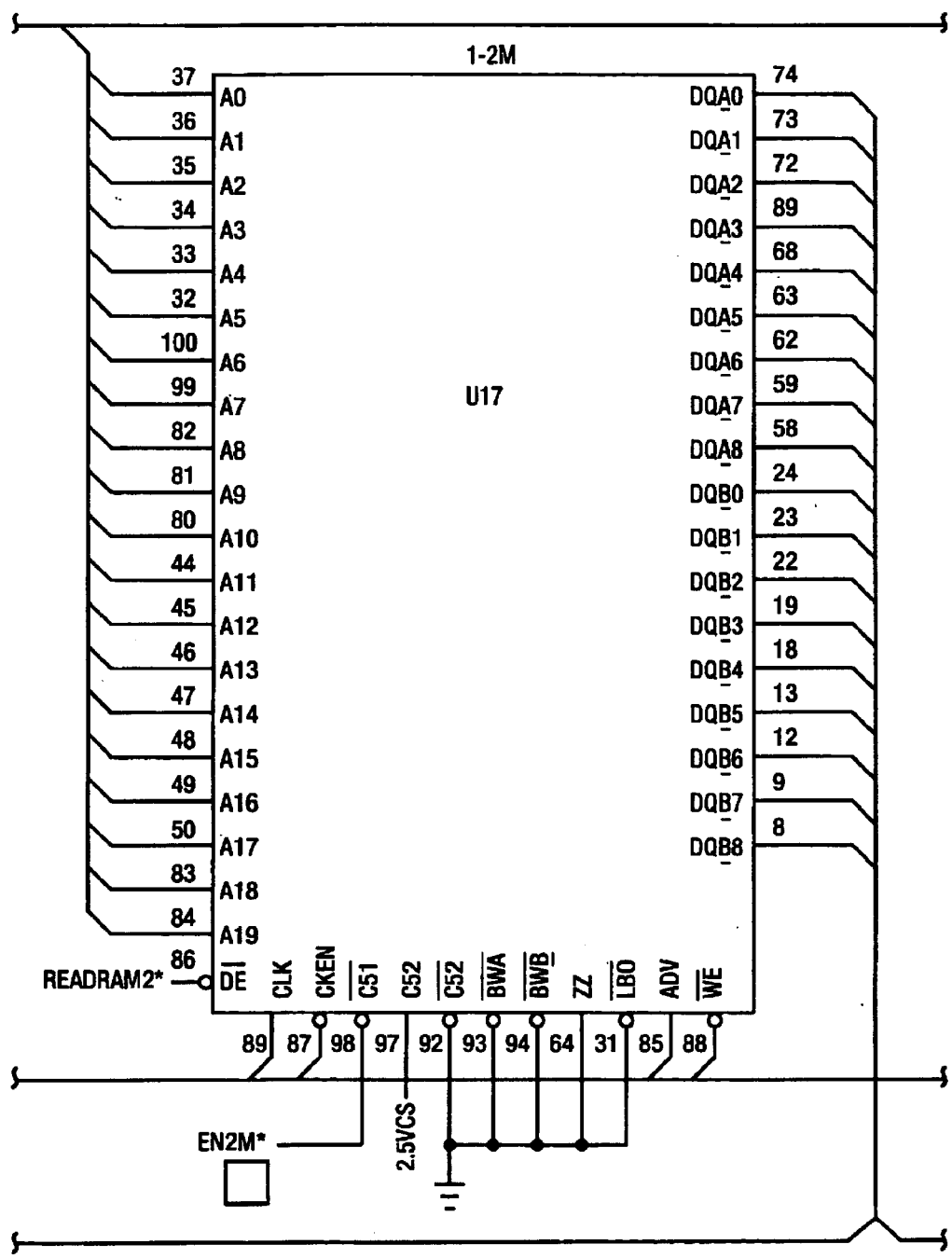
Fig. 3F.1

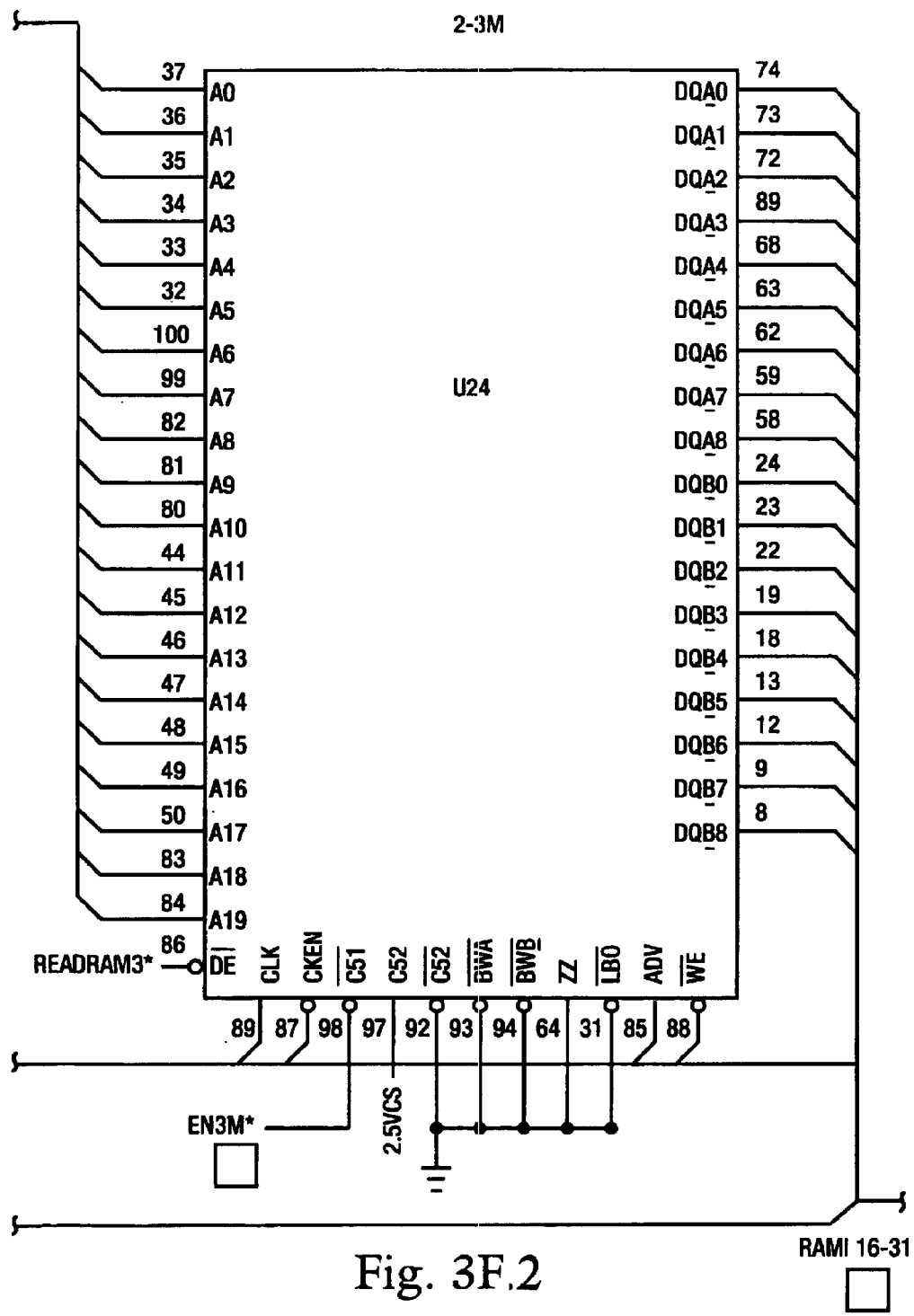
Fig. 3F.2

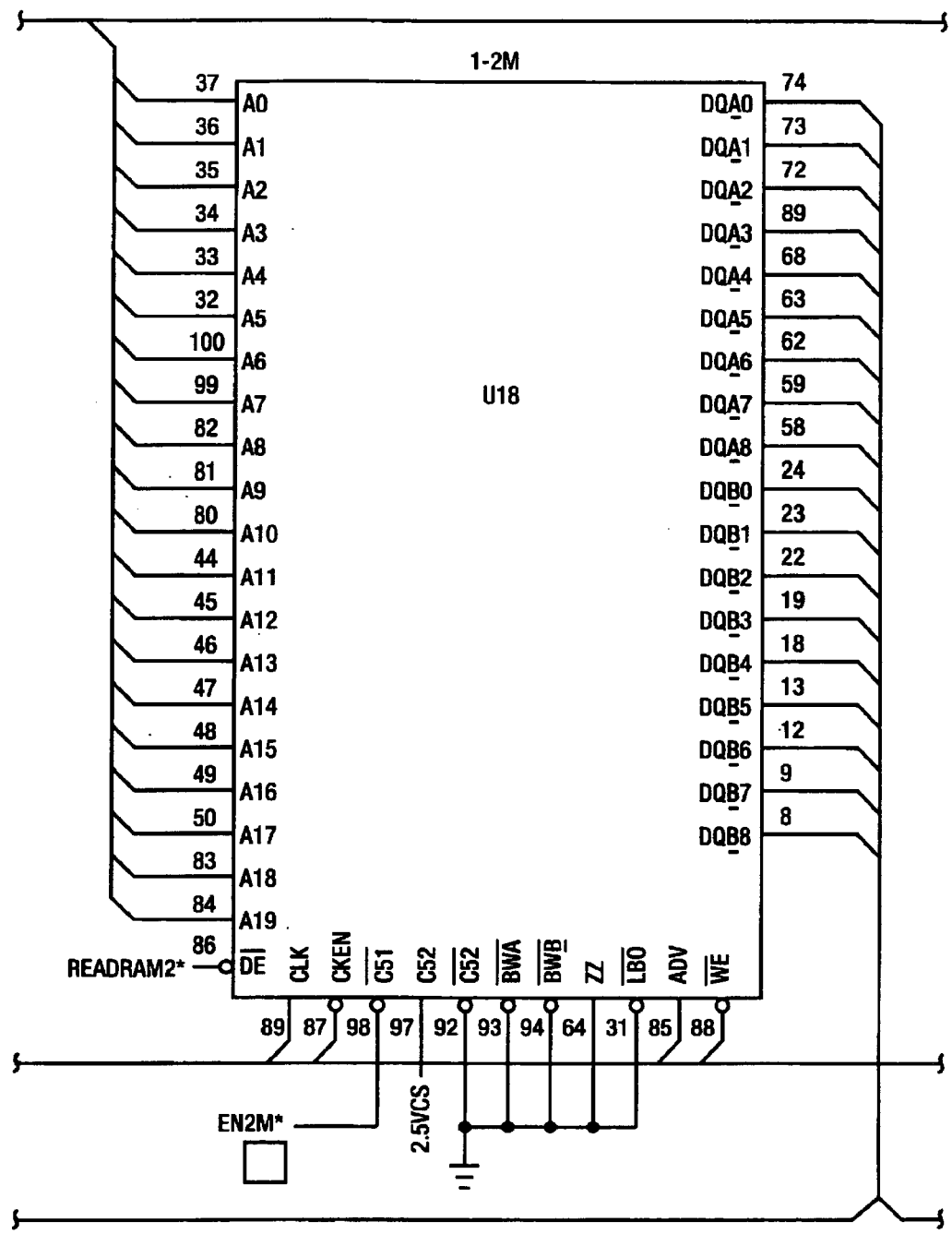
Fig. 3G.1

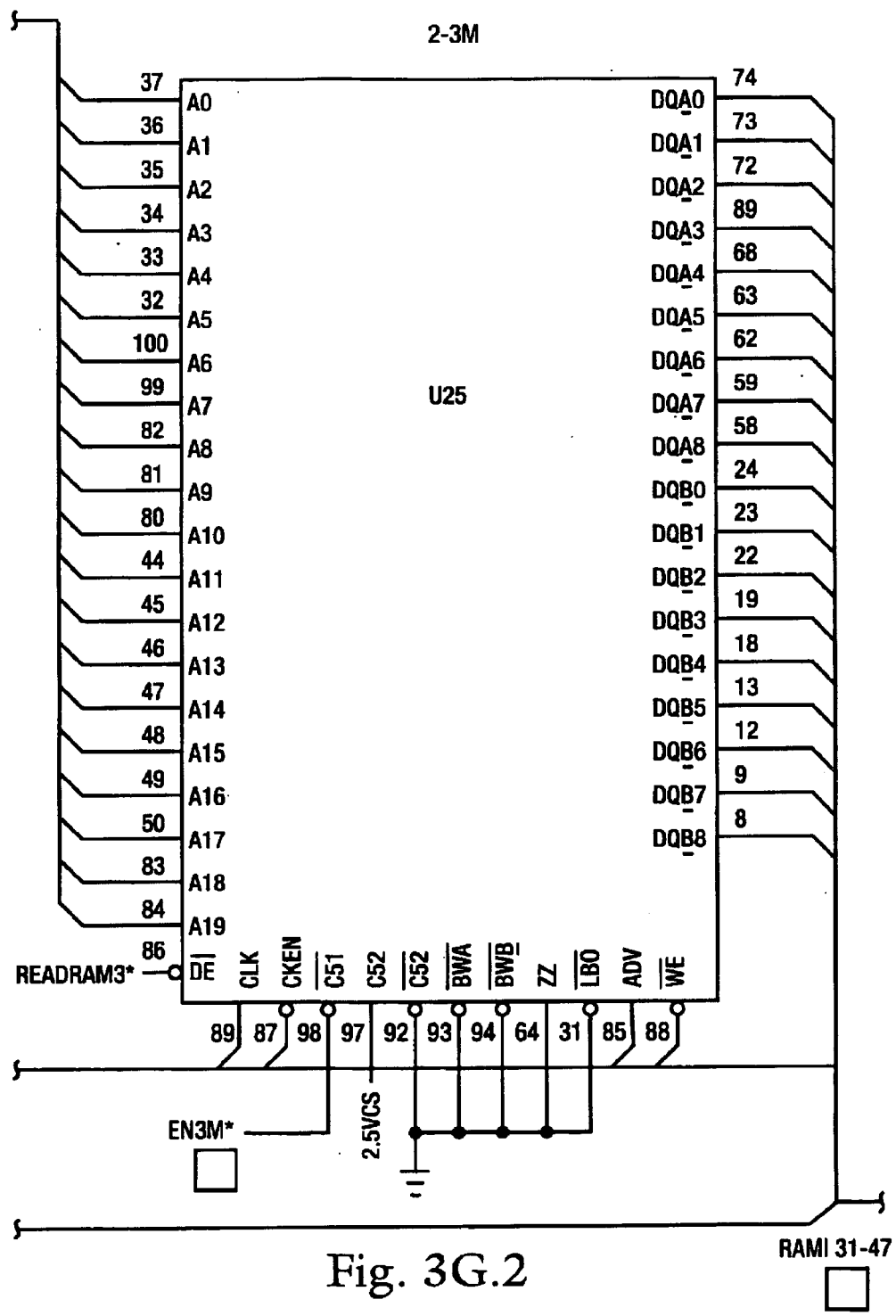
Fig. 3G.2

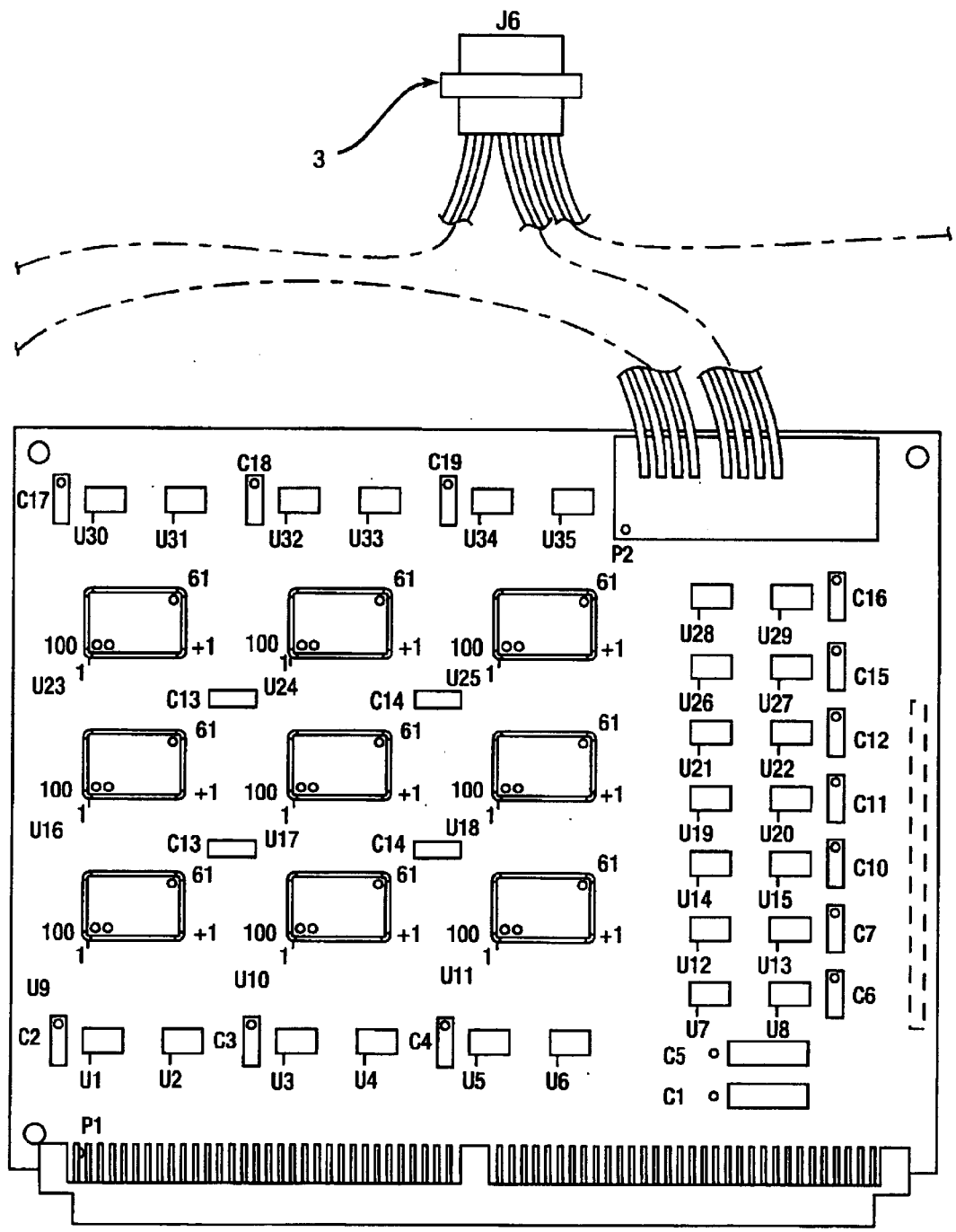
Fig. 5.1

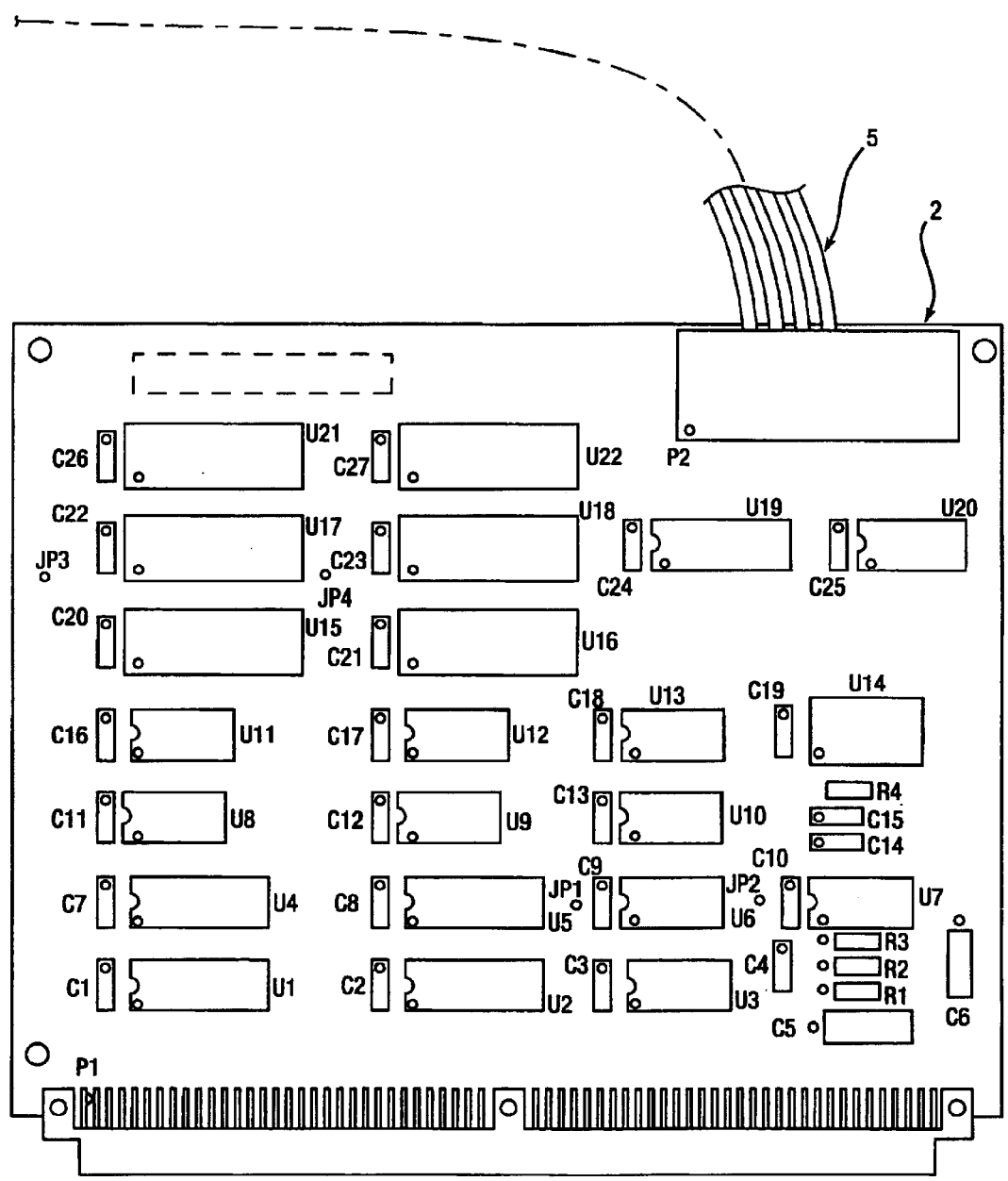
Fig. 5.2

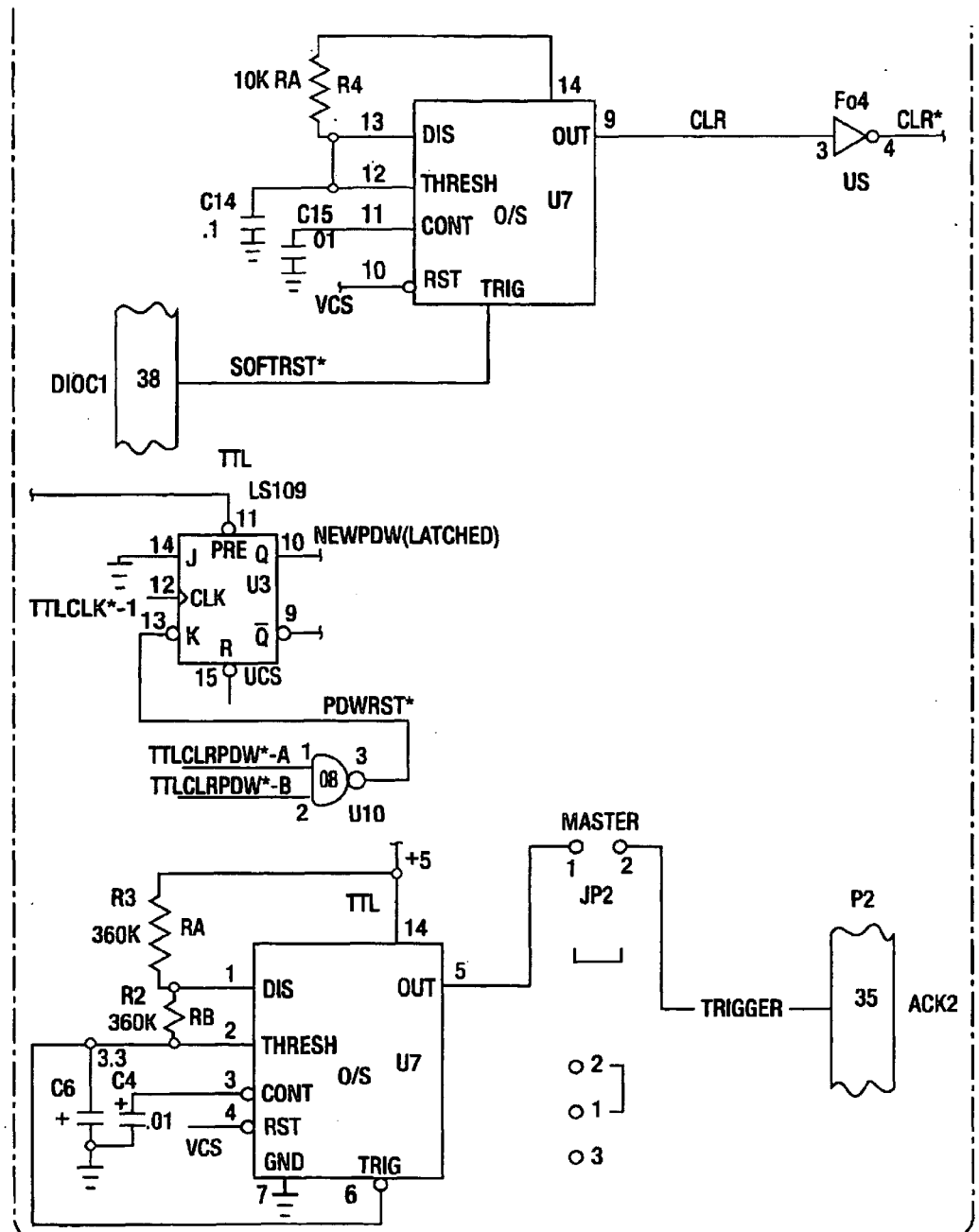
Fig. 6A.1

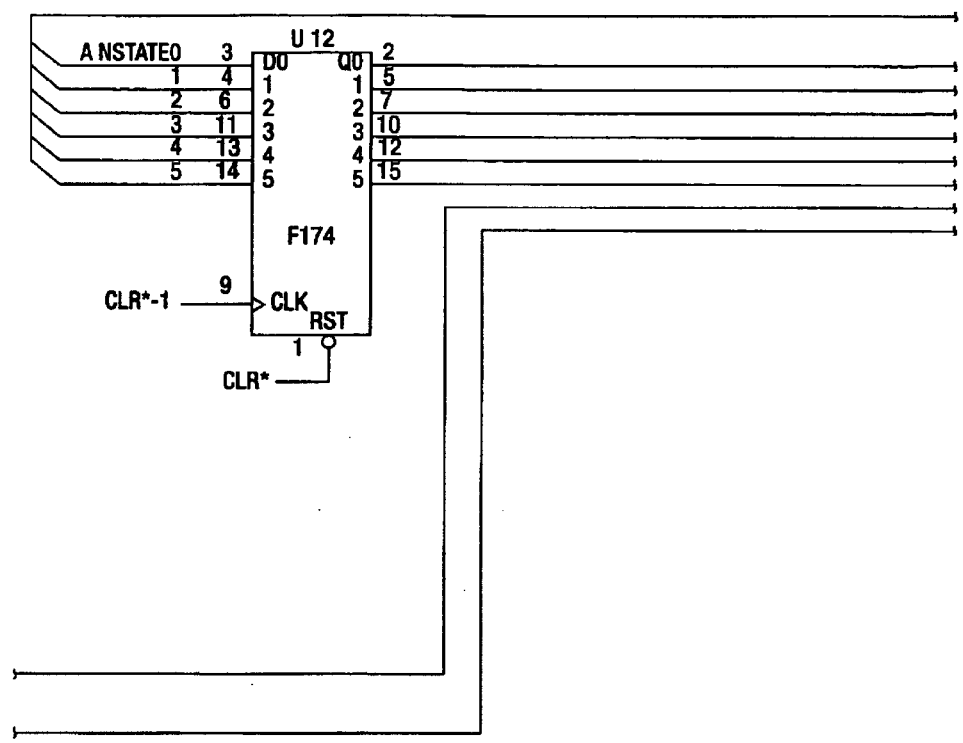
Fig. 6B.1

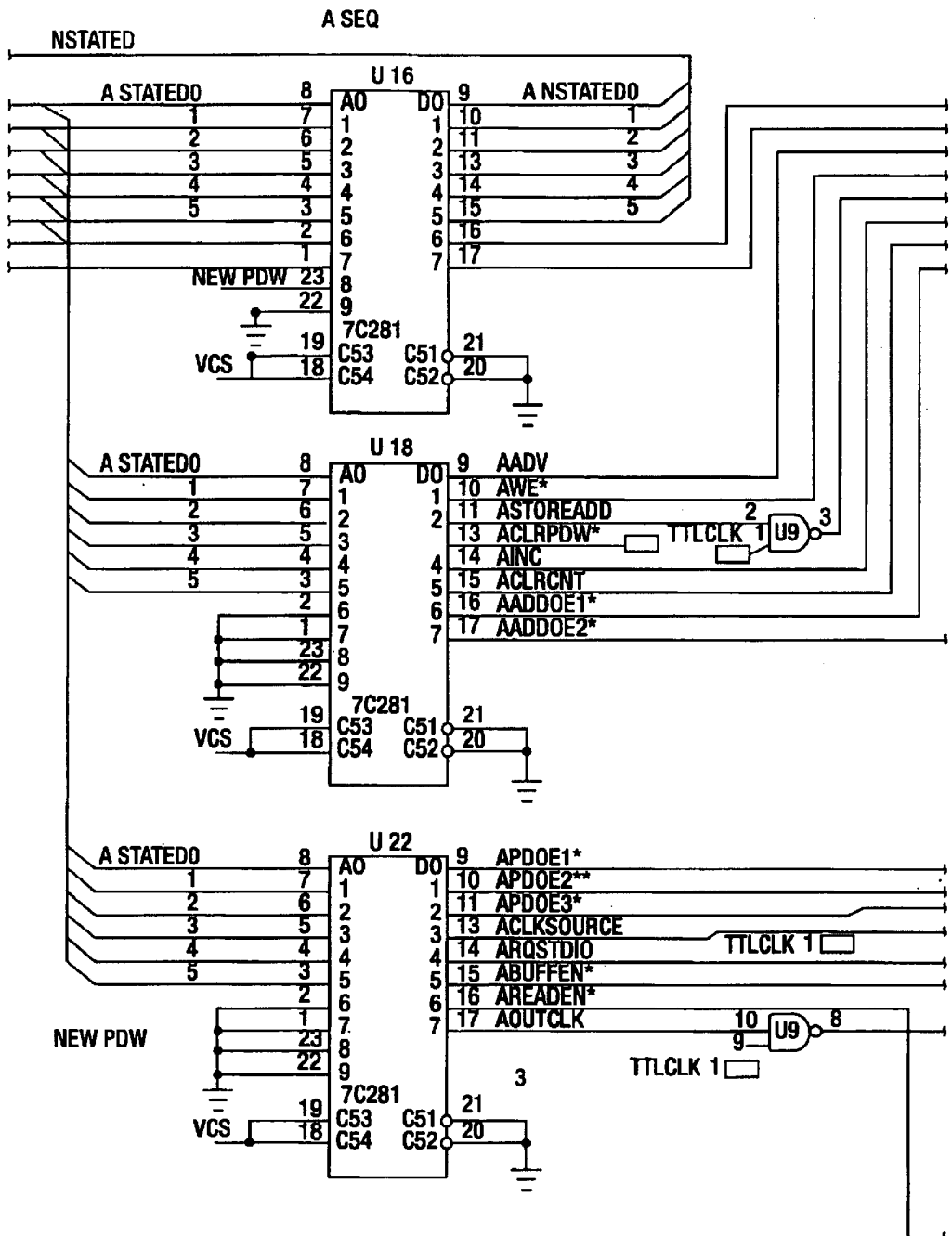
Fig. 6B.2

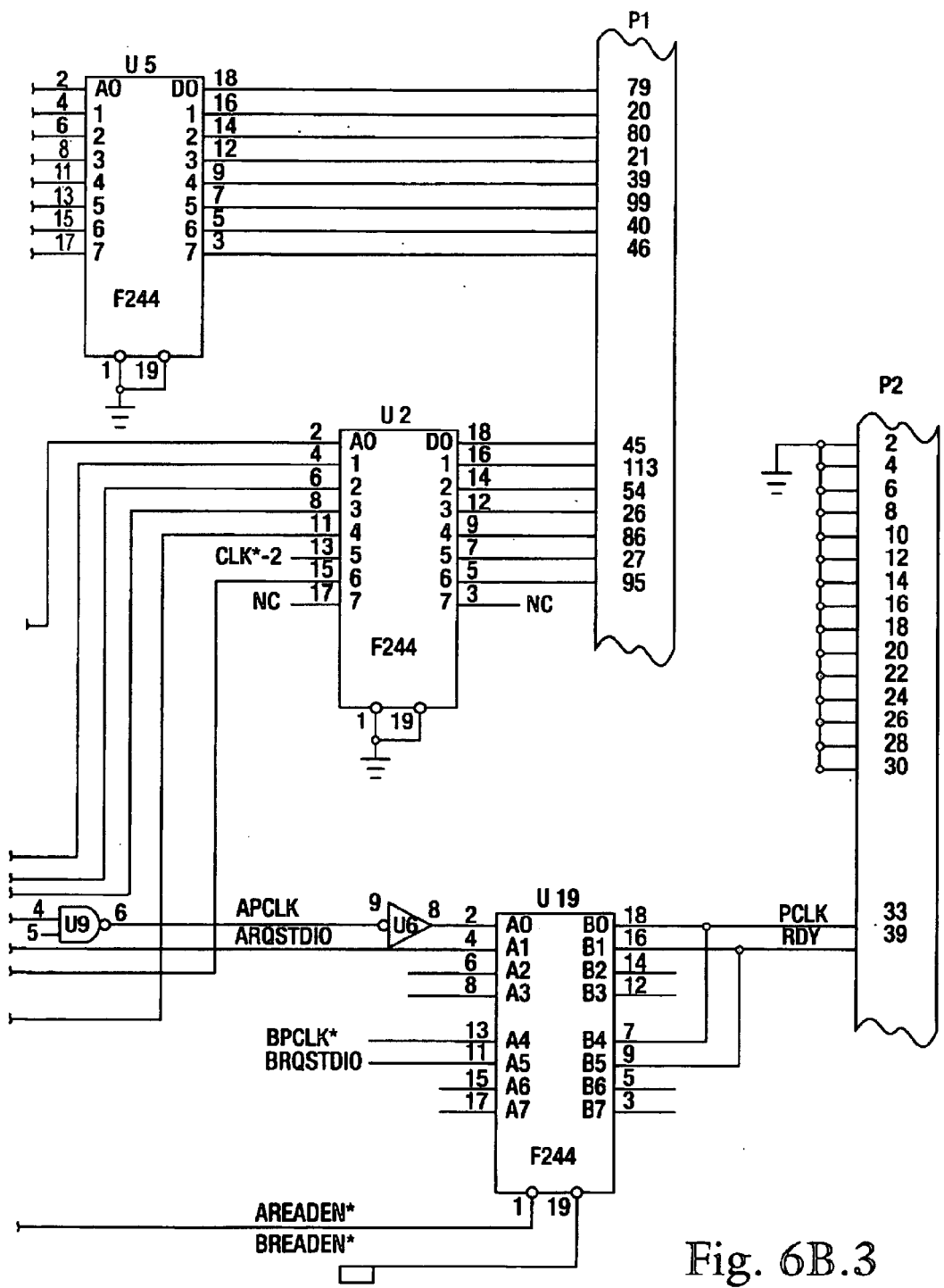
Fig. 6B.3

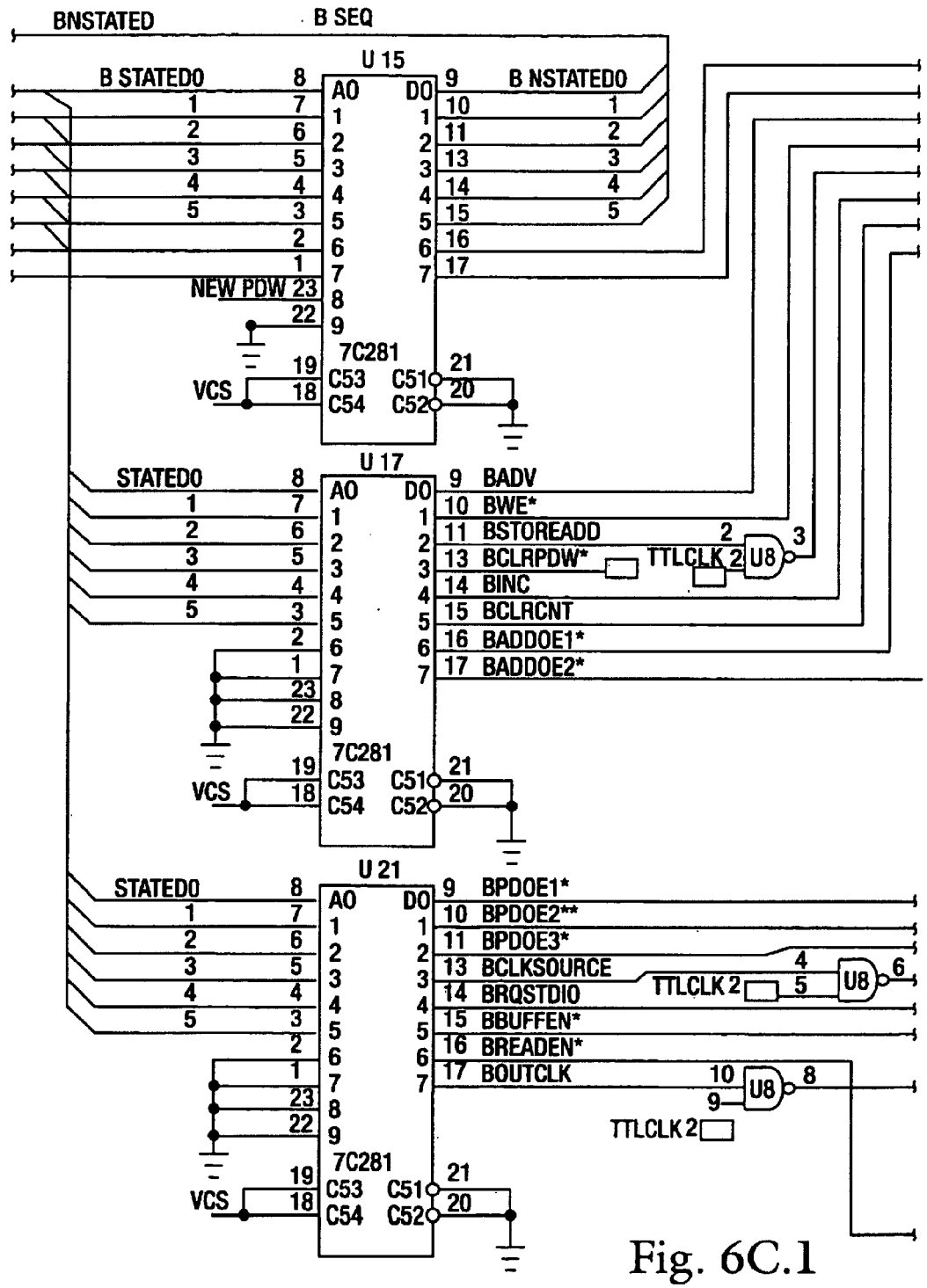
Fig. 6C.1

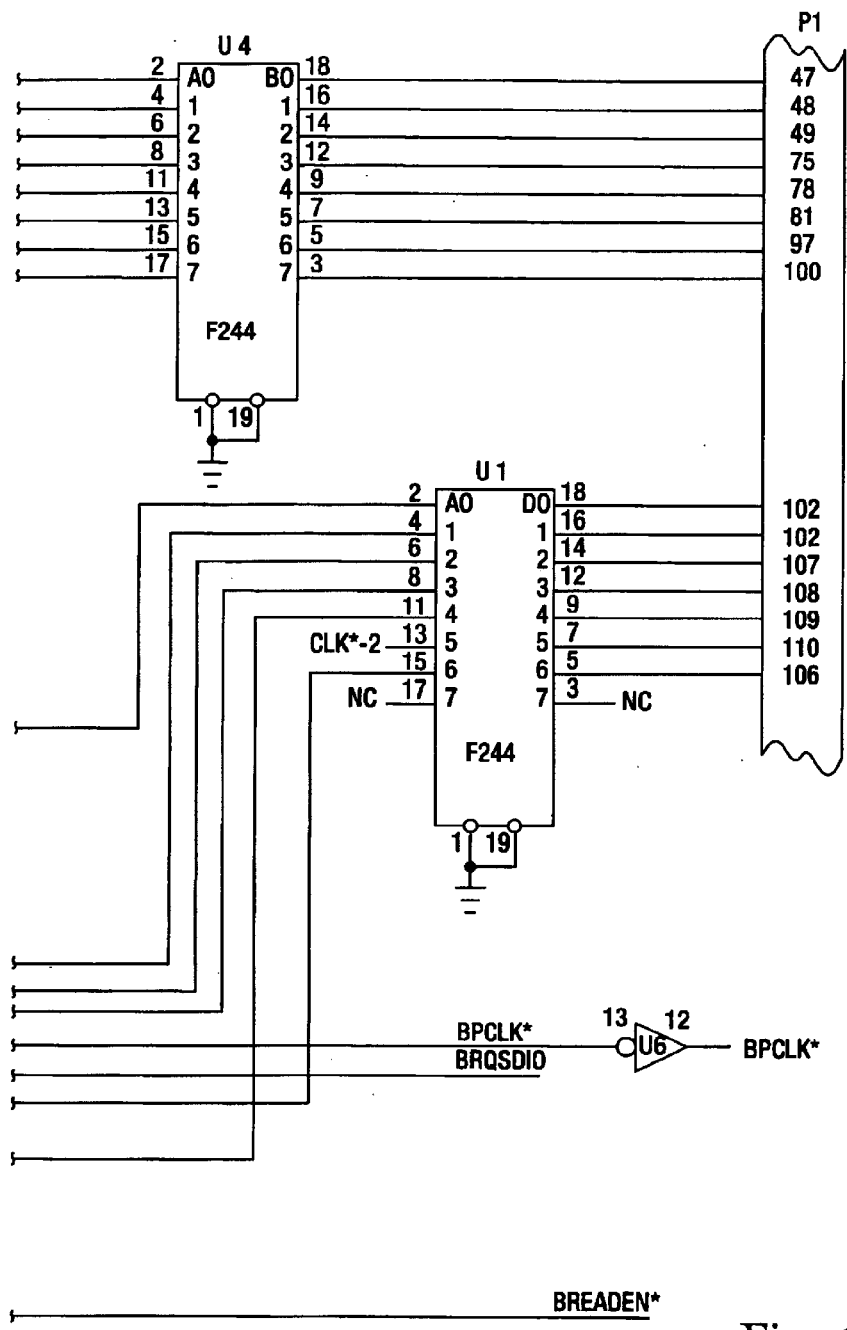
Fig. 6C.2

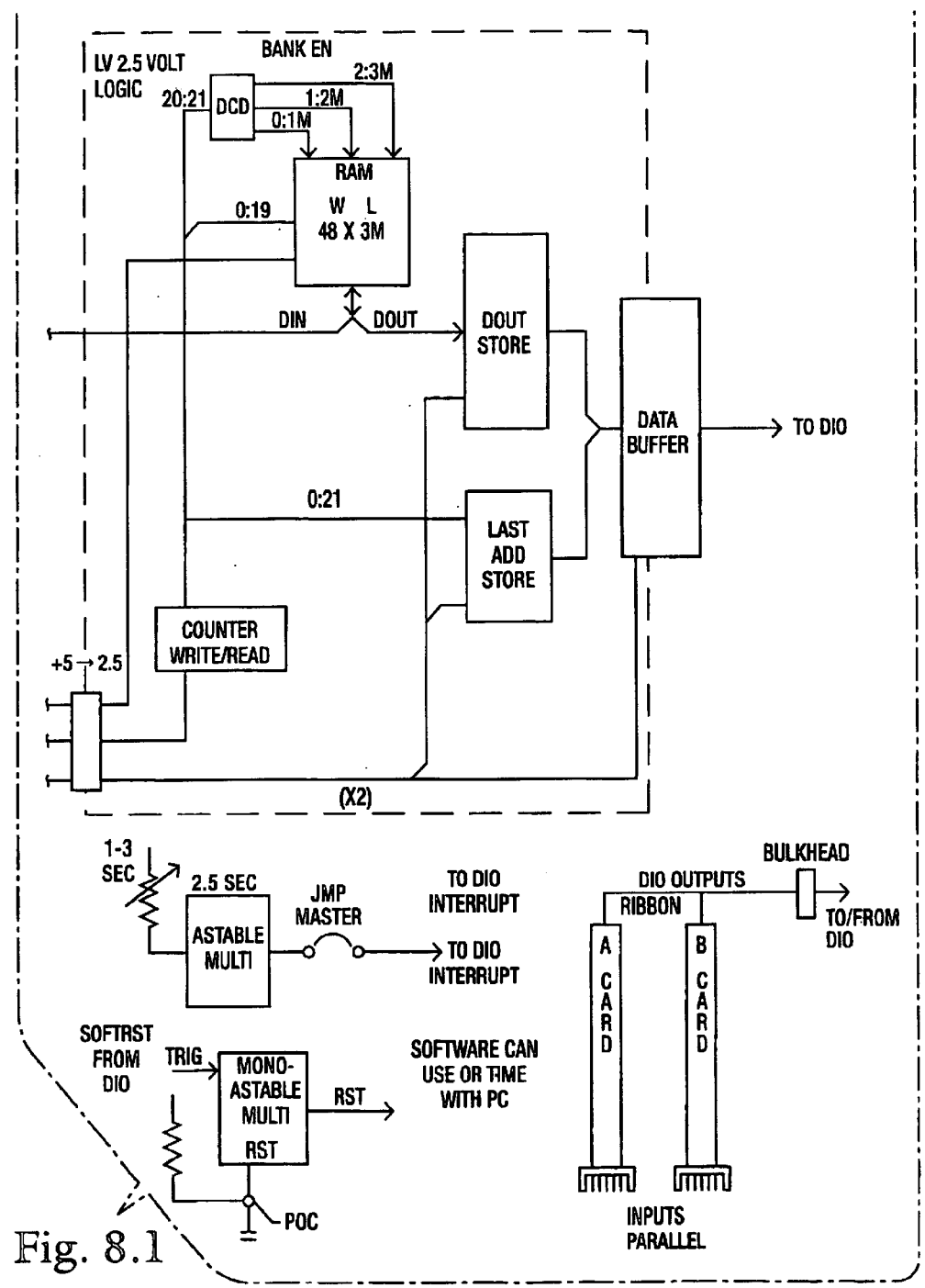
Fig. 8.1

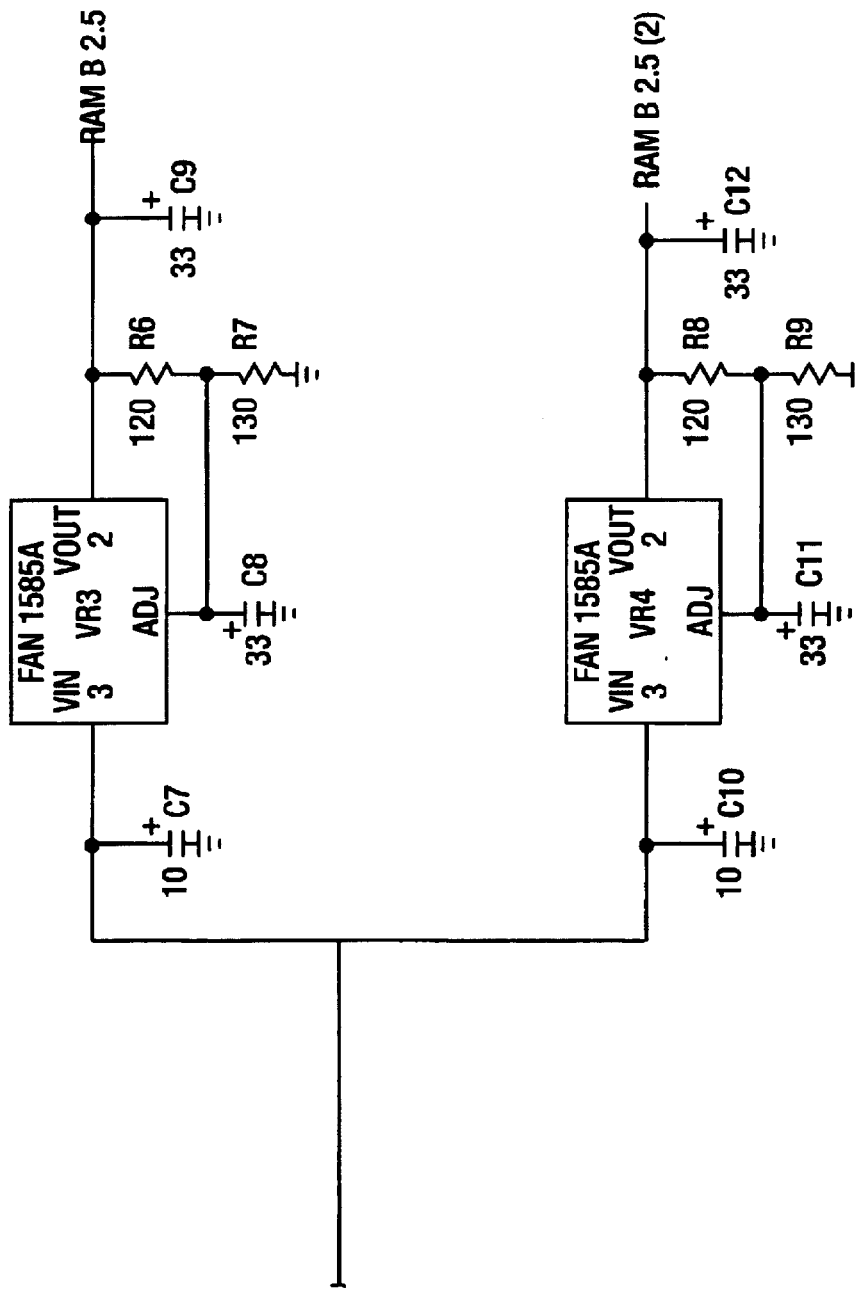
Fig. 9.1

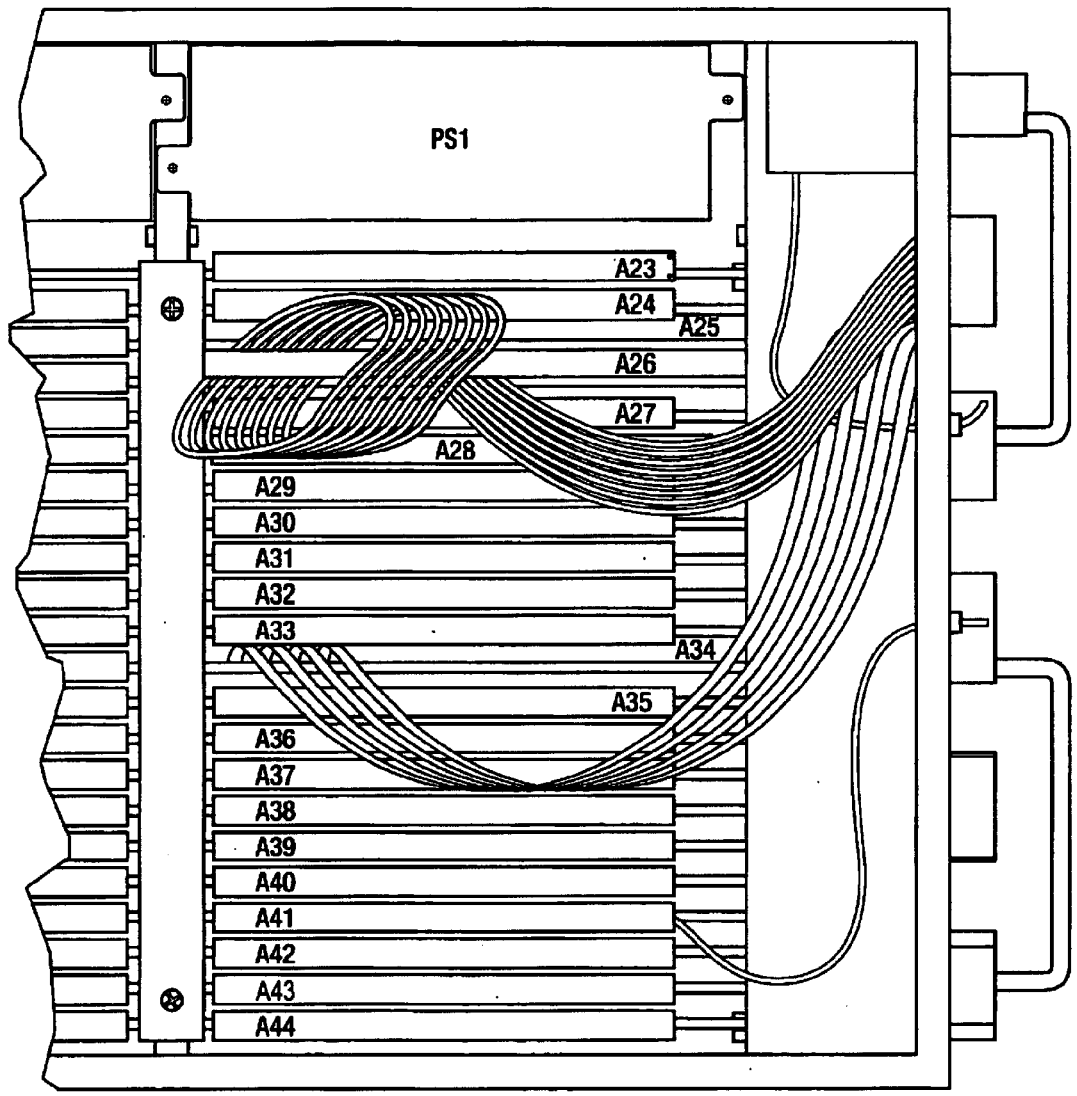
Fig. 11.1

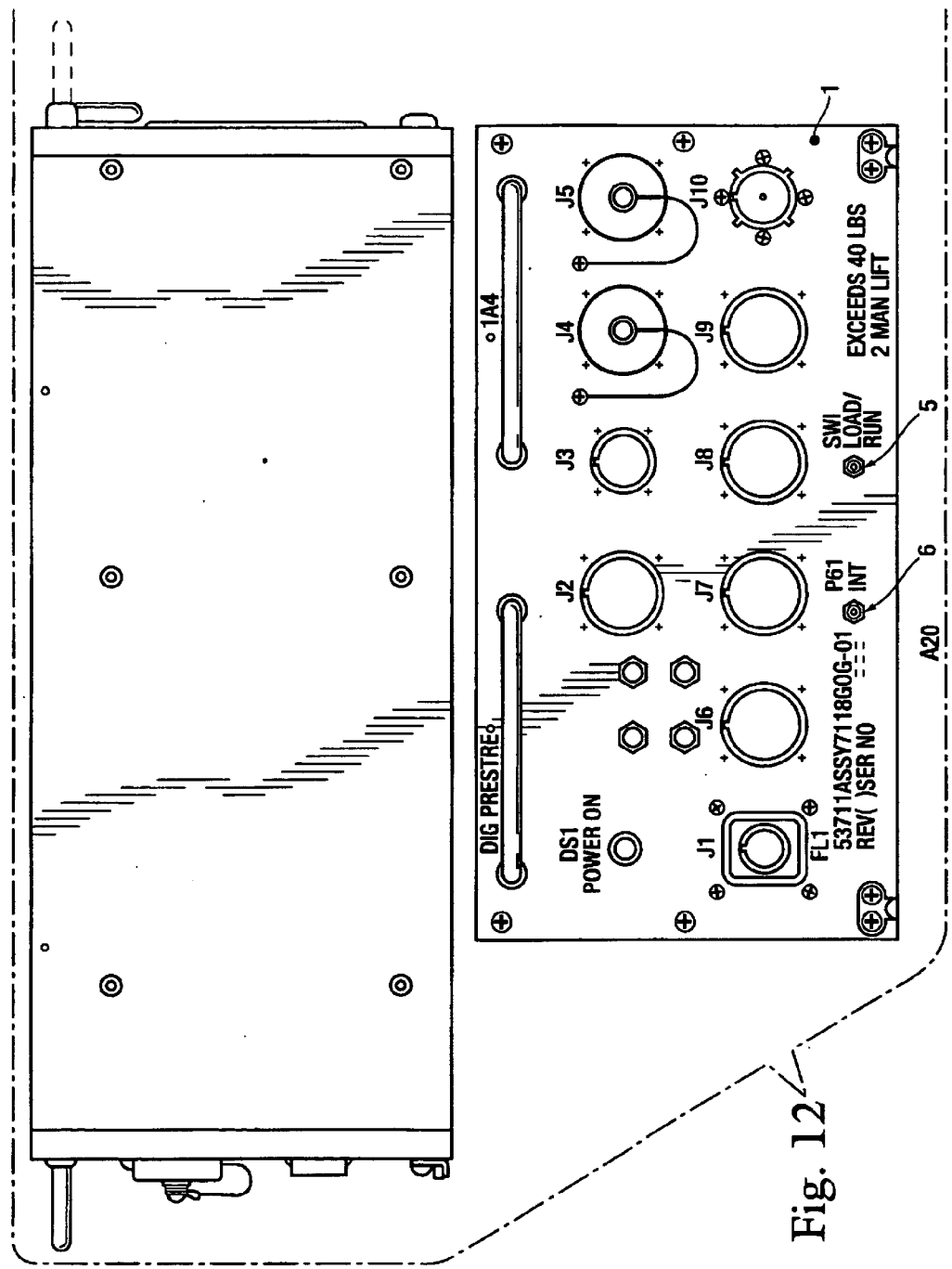

PULSE DESCRIPTOR WORD COLLECTOR

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

The invention relates to electronic surveillance (ES) and electronic counter measure (ECM) systems and, in particular, to a portable device capable of passively collecting and storing all digitized radio frequency (RF) pulse data received by an electronic surveillance system. The invention further relates to the method by which the device collects and stores said data.

2. Description of the Background

Electronic Surveillance ("ES") systems are used on all modern United States (U.S.) Navy ships. These systems receive RF signatures in the form of pulse data and digitize them. The data is then processed in order to identify signals and determine the nature of the signals, threatening or non-threatening, for the purpose of theater awareness and self-defense. The data processing is typically accomplished by sending the data through a presorter, filtering it, and comparing the filtered data to stored sets of parameters. Monitoring the performance of processors within ES systems currently in use on U.S. Navy ships is required for continued improvement in recognition capabilities.

Previously, such monitoring was accomplished by analyzing the ES system's response to controlled stimuli. The stimuli is typically supplied by radiating RF modulated pulses at the ES system antennas, injecting RF modulated pulses into the ES system cables, or using system specific built-in-test (BIT) capabilities. Each of these methods supplies RF modulated pulses that the ES system processes into digital PDWs. The ES system responds to the supplied RF pulses by either displaying the correct threat identification or producing active transmissions based upon a correct threat identification. Recordings are made of the response. By analyzing the recordings a judgment can be made on how well the system works.

Unfortunately, due to the ever-increasing complexity and density of emissions in the RF spectrum this method of assessing ES system performance is out-dated and insufficient. Specifically, it does not allow for a more detailed analysis, based upon a realistic and comprehensive RF environment, to determine the cause of an incorrect response. Adequate assessment of the performance capabilities of a particular ES system requires an in-depth analysis of all received (vice supplied) RF pulse activity for a given time period. Only with such an assessment can there be a realistic improvement in the development of radar and threat recognition algorithms.

Many ES systems and electronic counter measure (ECM) systems have the ability to sample and temporarily store the RF parameter data of a singular received RF pulse. This pulse is finely sampled across its duration. This sampling information allows the recreation of the pulse for output. However, modern ES and ECM systems do not possess long-term multi-pulse storage capability. In ECM systems the goal of the memory is to affect a short delay in the retransmission of data. This delay equates to range when viewed from a hostile perspective. Digital radio frequency memory (DRFM) or other memory is used to capture, store and then retransmit RF energy a short time later. This is often referred to as an RF delay line. Once the data has been re-transmitted, it is no longer held in memory. For example, U.S. Pat. Nos. 4,891,646, 4,713,662 and 4,743,905 to Wiegand, U.S. Pat. No. 4,885,587 to Wiegand et al., and U.S. Pat. No. 4,928,104 to Schaffer all discuss various forms of DRFM for use within ECM systems. Specifically, these DRFMs are designed for use within active radar jamming systems. In each form the purpose of the DRFM is to allow the radar jamming system to capture received radar signals, manipulate or alter them in time or phase, as necessary, and return them on demand to confuse enemy radar systems. U.S. Pat. No. 5,032,839 to Even-Or employs optical RF memory for the same purpose.

Several other prior art references also disclose the use of short-term memory to improve the speed and accuracy of ECM or ES systems.

U.S. Pat. No. 4,145,691 to Freeling et al. patents a memory system which finds particular use in ECM systems. It uses memory to establish a feedback loop to recirculate RF burst signals which are emitted by enemy radar systems.

U.S. Pat. No. 4,217,580 to Lowenschuss discloses a complete ECM system. In this system RF signals are converted to digital words. The digital words are then pre-sorted. Once a predetermined number of digital words associated with one radio frequency signal is collected, that data is passed to a computer. This computer will then compare the signature to that of a library, recognize the threat and determine the counter technique called jamming. U.S. Pat. No. 4,879,561 to Inkol discloses a filter system for analyzing interleaved pulse descriptor words (PDW) received from a multiplicity of radar signals. This system incorporates a buffer memory. The buffer memory is organized to allow data corresponding to a particular radar emitter to be efficiently accessed for further analysis within the radar system.

U.S. Pat. No. 4,025,920 to Reitboeck et al. discloses an apparatus and method for identifying incoming radar signals by comparing them with stored sets of parameters. Similarly, a radio frequency detection and collection system (RFD/CS) produced by Wide Band Systems, Inc. uses an antenna array and instantaneous frequency measurement (IFM) receivers to collect RF signals and convert them into PDWs. The PDWs are then transmitted to a computer workstation for analysis. The purpose of the computer workstation in this RFD/CS system is used to compare the incoming PDWs with stored parameters in order to identify the intercepted emissions. None of the above-mentioned references discloses a system that records the total RF environment for long-term use.

Thus, there is a need for a portable PDW collector designed to passively collect and record all received RF emissions for later comparative analysis in a laboratory environment. This portable PDW collector enables the capture for analysis of all RF activity within any given theater of operation or important point around the world. Such a PDW collector would provide a convenient and cost-effective device that can easily be carried onboard a U.S. Navy vessel and integrated into its ES system. The alternatives to this solution, including installation on each vessel of another independent ES system capable of collecting the required data or an invasive redesign of all ES systems, are cost prohibitive.

SUMMARY OF THE INVENTION

It is an object of the present invention to provide an apparatus for passively collecting and recording all digitized RF pulse data received by a ship's ES system. The digitized data typically includes parameters such as time of arrival, angle of arrival, amplitude, pulse width and frequency.

It is another object of this invention to provide a method for collecting and recording digitized RF pulse data. As described above, the collected data can be analyzed in order to test the detection and identification capabilities of current ES systems and to improve upon those detection and identification capabilities.

The foregoing and other objects are generally obtained by providing a pulse descriptor word collector (PDW collector) comprised of a PDW extractor and a PDW computer.

The object of the PDW extractor is to coincidentally collect all RF pulse data as the ES system receives it without impacting upon normal ES operations or intruding into ES system Ship Replaceable Units (SRUs). The ES system receiver receives RF pulse data, formats it into digital pulse descriptor words (PDWs), and forwards the data to the ES system presorter. The PDW collector is integrated into a ship's ES system between the ES system receiver and presorter. All PDWs that are transmitted from the receiver are diverted to the PDW extractor, flowing through the PDW extractor and on to the presorter. The PDW extractor passively monitors the transmissions carrying PDW data. Once data collection is initiated, the PDW extractor captures the incoming data, storing it in memory and simultaneously allowing the data to flow unaltered and uninterrupted to the ES system presorter. The PDW extractor then internally processes the captured data.

Upon capturing PDW data, the PDW extractor initially stores the data in a buffer or holding register. It then writes the data onto one of two RAM circuits. Incoming PDWs are written on to one of the RAM circuits, while PDWs that were previously stored on the other RAM circuit are simultaneously read to and stored on the PDW computer. The object of this continuous read/write loop is to ensure that no data is lost.

The object of the PDW computer is (1) to control the functions of the PDW extractor, (2) to provide long term storage for all received PDW data, and (3) to store, analyze and manipulate said data using data management software. The PDW computer controls the PDW extractor through specially written graphical user interface (GUI) software and multi-state sequencing software. The GUI software gives the user point and click control of the PDW extractor, allowing the user to initiate and/or terminate data collection. The multi-state sequencing software controls the data processing within the PDW extractor. Specifically, the sequencing software controls the RAM Control within the PDW extractor by: (1) monitoring a strobe that indicates data is being received by the ES system and is ready for collection; (2) selecting which RAM circuit to write the data on to; (3) writing the data onto the RAM circuit; (3) switching the RAM functions from write to read and vice versa; and, (4) reading the data to the PC computer.

The foregoing PDW collector has enough speed and memory to record all RF signals present in the dense pulse environments of any given theater for an extended length of time. Specifically, the PDW collector is capable of collecting a minimum of one million RF pulses per second. The preferred embodiment of this invention provides for storing the collected data on the PDW computer on high-speed Redundant Array of Independent Disks (RAID) hard drives.

The above-described apparatus, capable of operating on any ship class using an ES system, is portable (easily from ship to ship or from ship to laboratory) and acts as a referee receiver (providing redundant proof of the signals received).

BRIEF DESCRIPTION OF THE DRAWINGS

The following figures are illustrative of the preferred embodiment of the present invention:

FIG. 12 is a drawing illustrating the PDW extractor's exterior mechanical assembly.

DETAILED DESCRIPTION OF THE PREFERRED EMBODIMENT

The present invention, a pulse descriptor word (PDW) collector, comprises an apparatus for controlled collecting and recording of all RF pulse data received by a ship's electronic surveillance (ES). The PDW collector coincidentally collects the RF pulse data as the ES system receives it (after formatting into digitized PDW data). The PDW collector includes: (1) a portable PDW extractor unit 10, and (2) a high-speed PDW computer 20.

Figure 1:
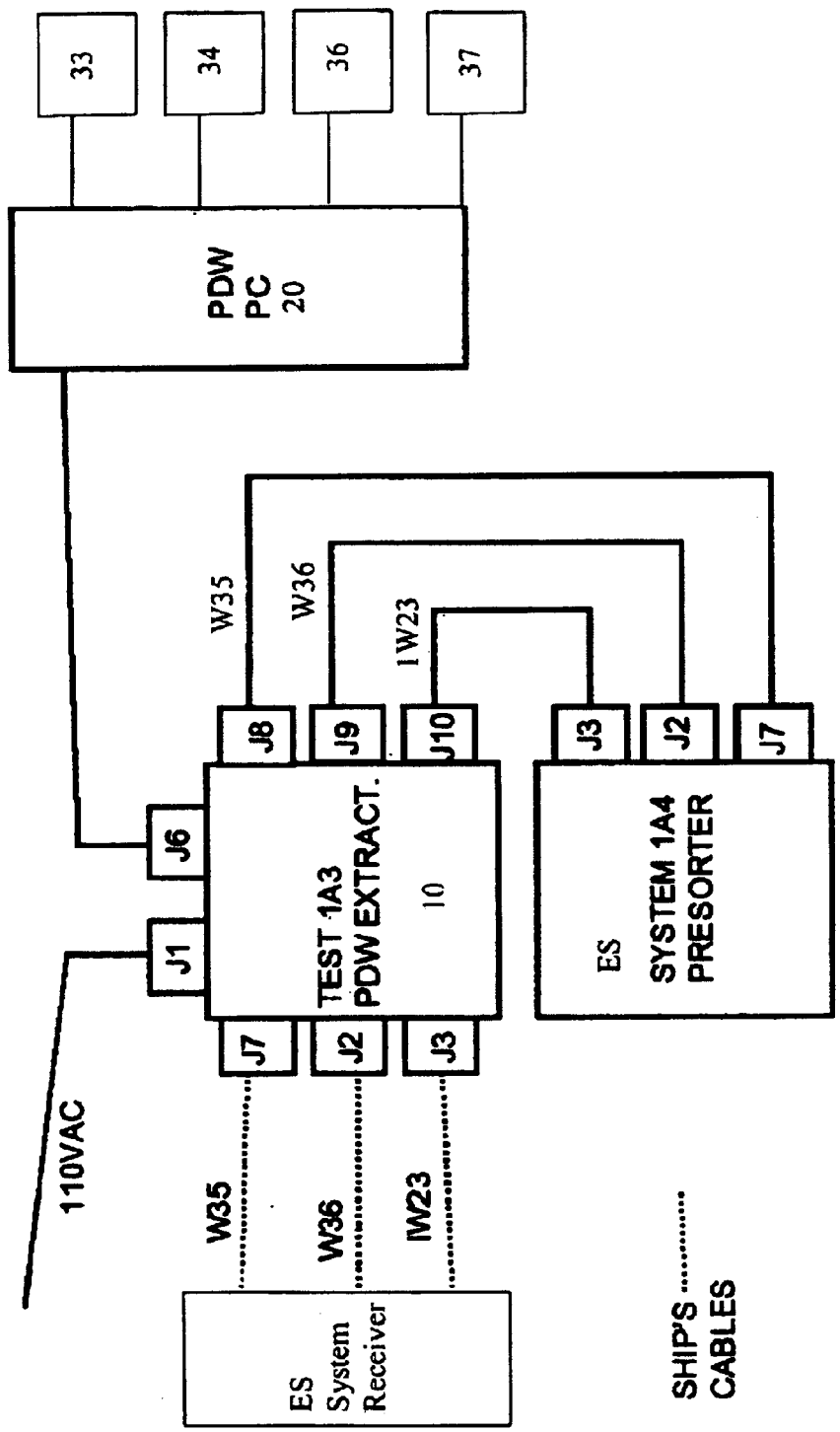
FIG. 1 is a block diagram illustrating the integration of the PDW collector, including the PDW extractor and the PDW computer, into an ES system.

FIG. 1 illustrates that the PDW extractor 10, an electronics unit, is integrated with a ship's ES system after the point at which RF signals have been converted into PDW data by the ES system receiver and parallel to the point where the PDW data is processed by the ship's ES system presorter 1A4. The PDW extractor 10 has an input connection J1 for powering the unit. In addition it has input connections J7, J2, and J3 connected to ship's cables W35, W36, and IW23, respectively, which are in turn connected to the ship's ES system receiver. Input/output connection J6 is for receiving instructions from and sending data to the PDW computer 20.

Data captured and stored by the PDW extractor 10 is also simultaneously forwarded, unaltered and uninterrupted, to the ES system presorter 1A4 via output connections J8, J9, and J10 which are connected, respectively, by cables W35, W36, and 1W23 to the ship's ES system presorter 1A4 at its input connections, J7, J2, and J3. Thus, the PDW extractor 10 and the ES system presorter 1A4 are able to processes the same data at the same time.

Figure 2:
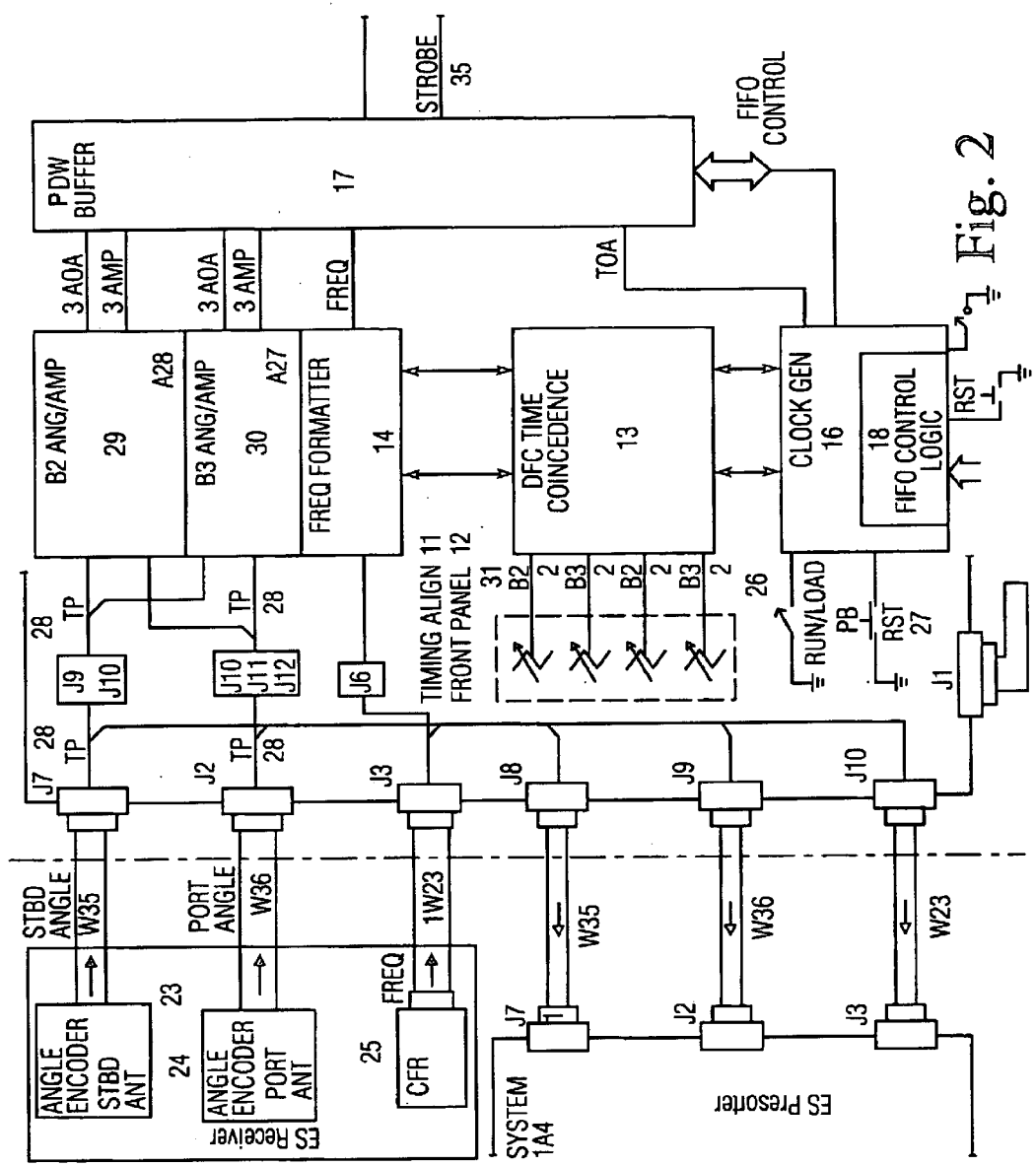
FIGS. 2 and 2.1 are a detailed block diagram of the PDW collector, illustrating the hardware configuration and interconnections.
Figure 3:
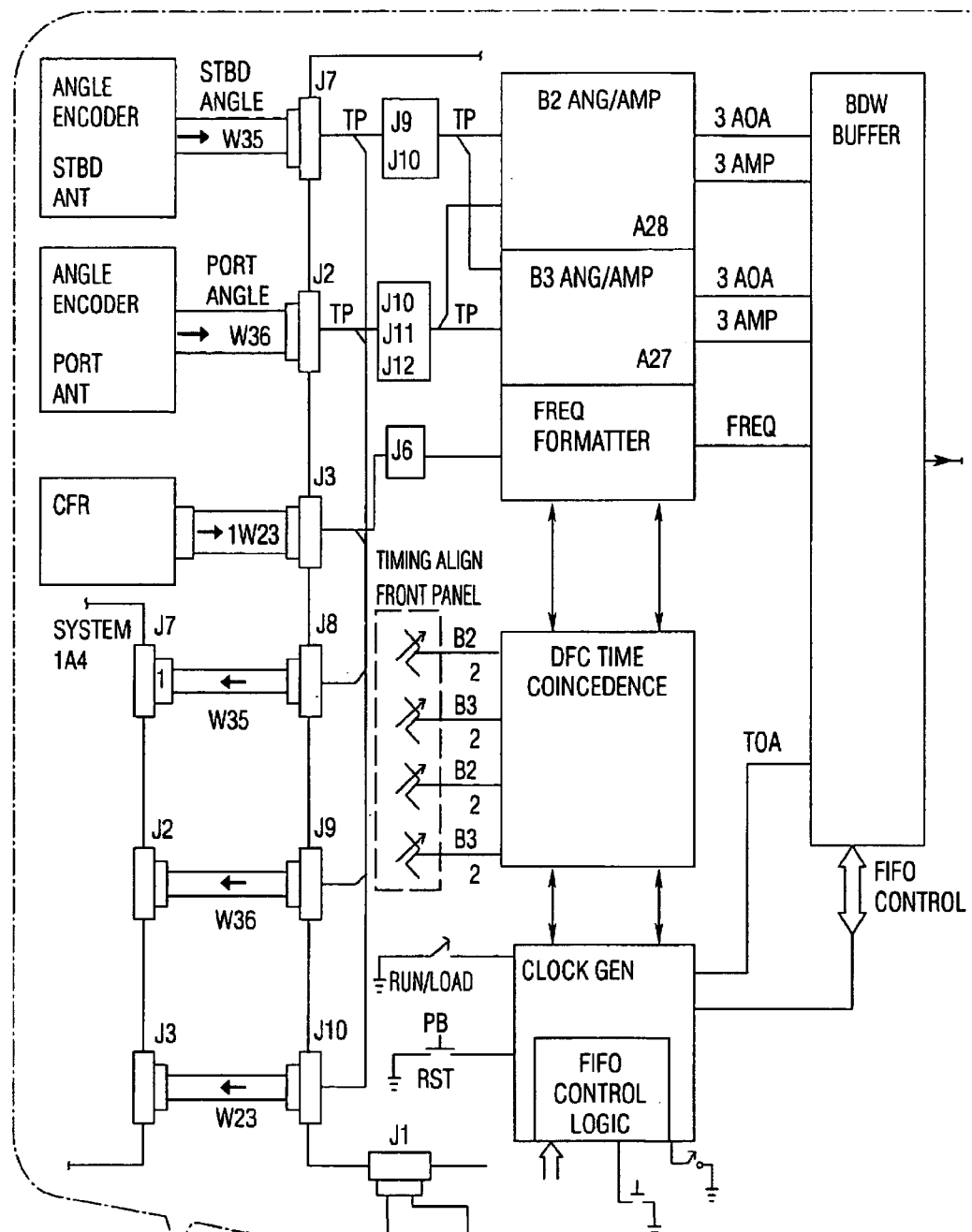
FIGS. 3A–3G.2 are detailed schematic diagrams of the RAM circuitry.
Figure 3A:
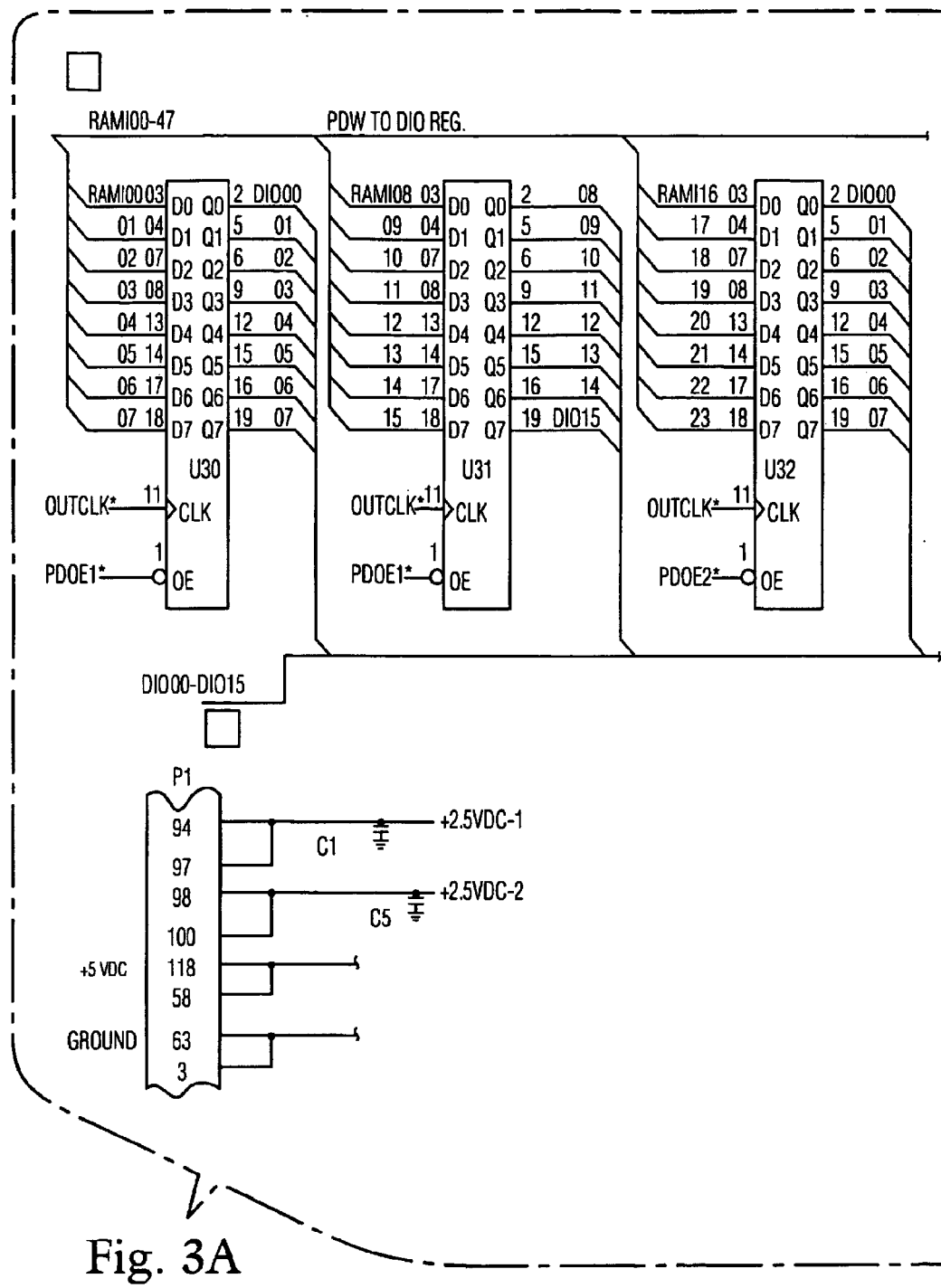
Figure 3B:
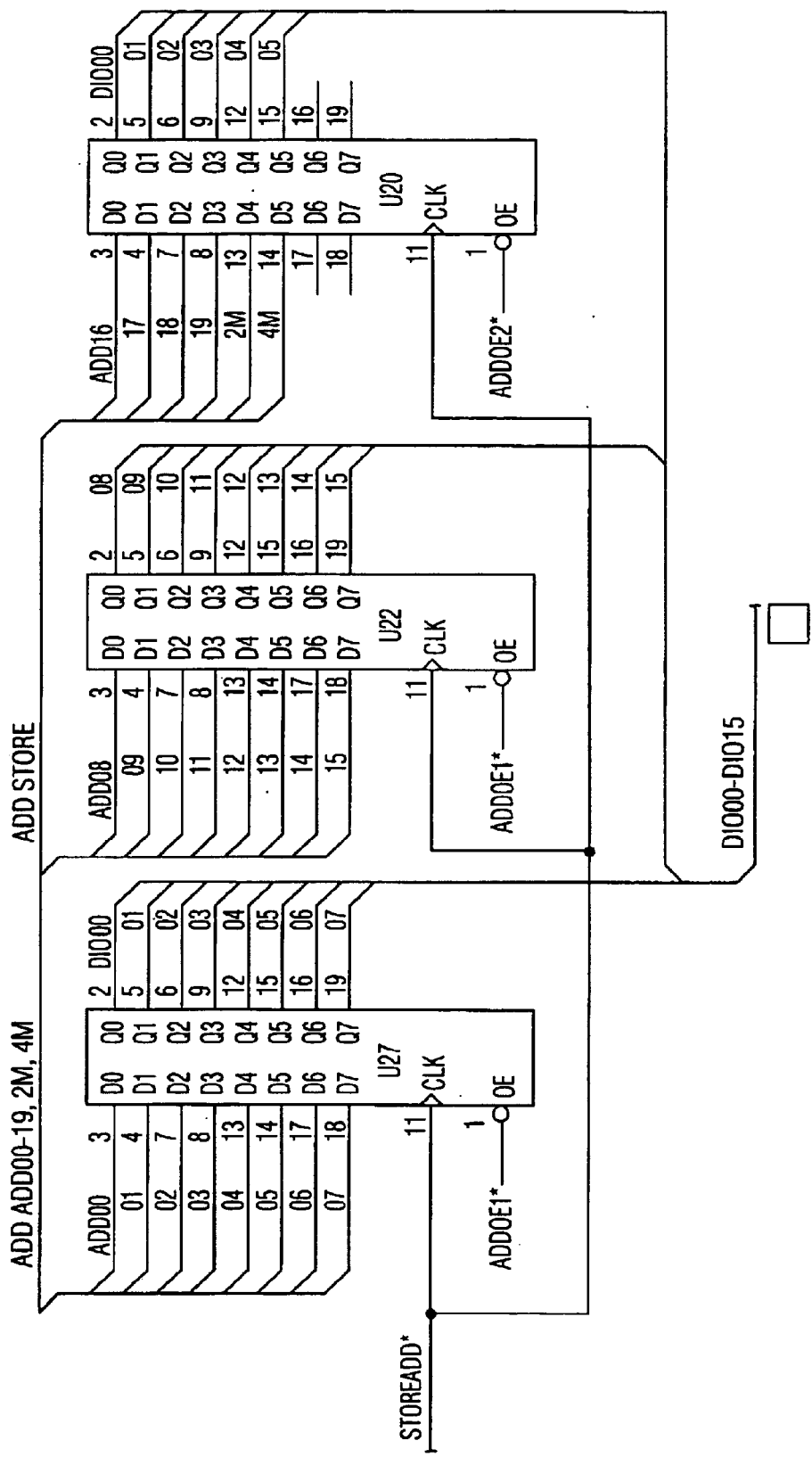
Figure 3D:
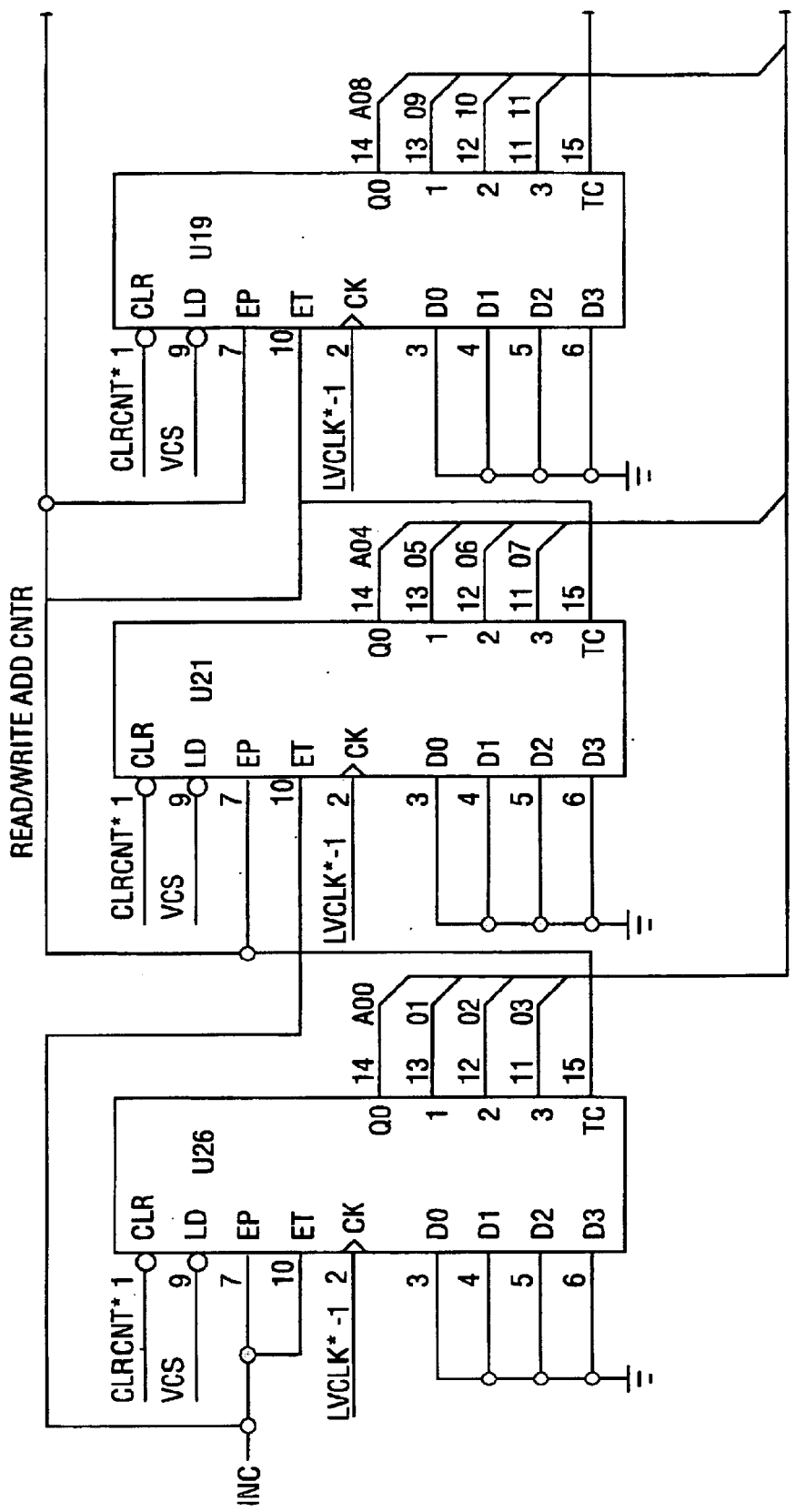
Figure 3E:
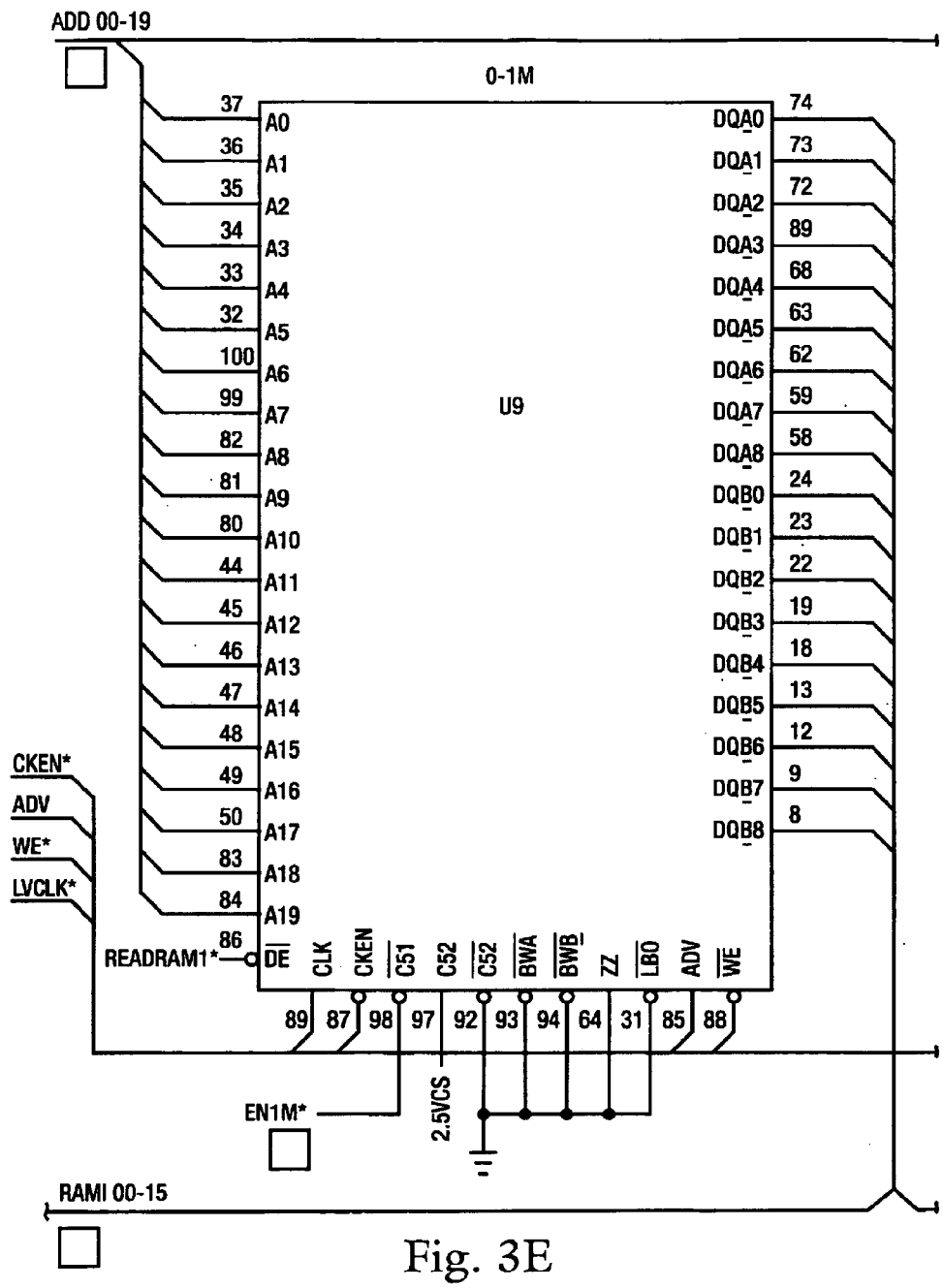
Figure 3F:
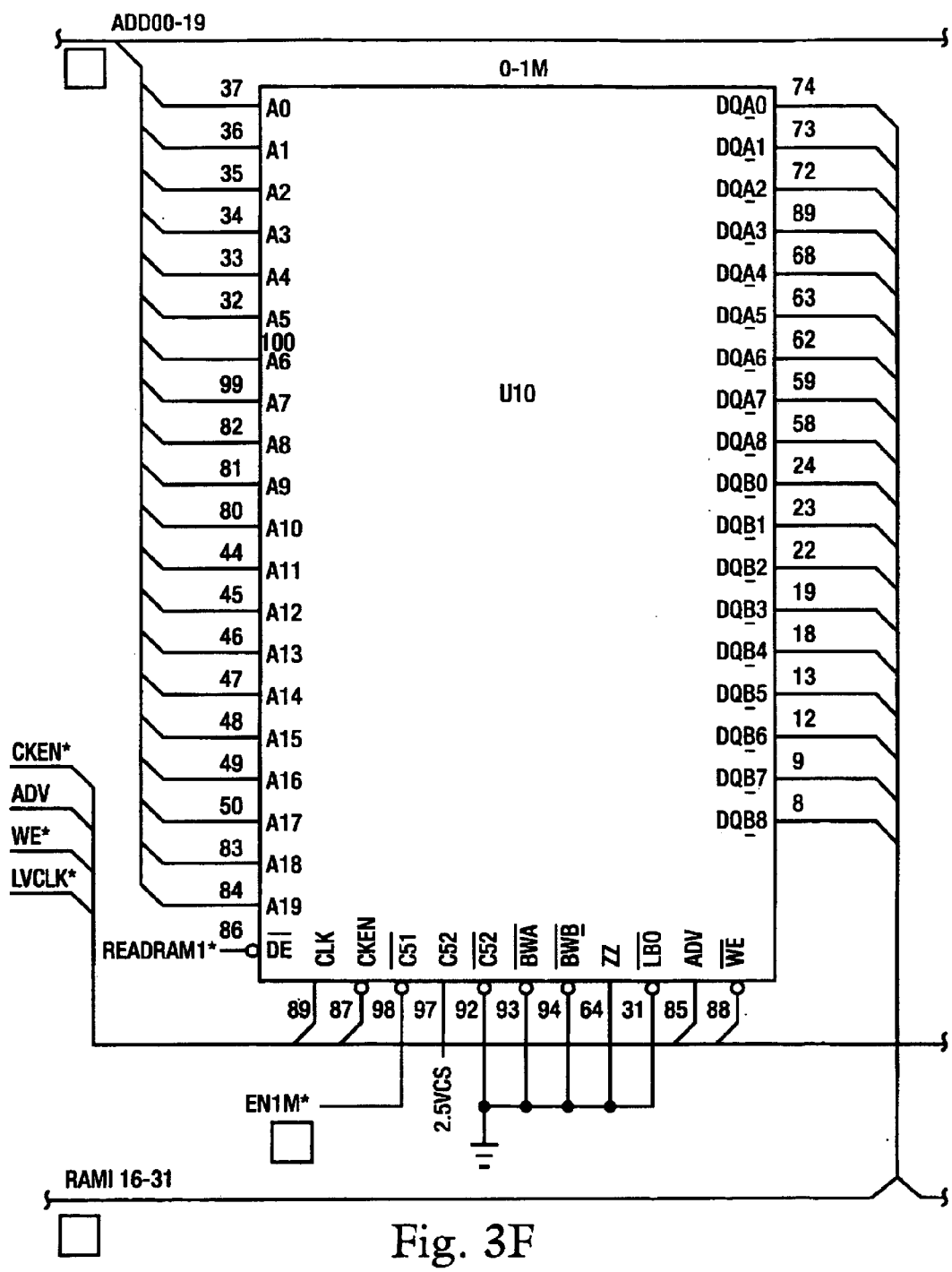
Figure 3G:
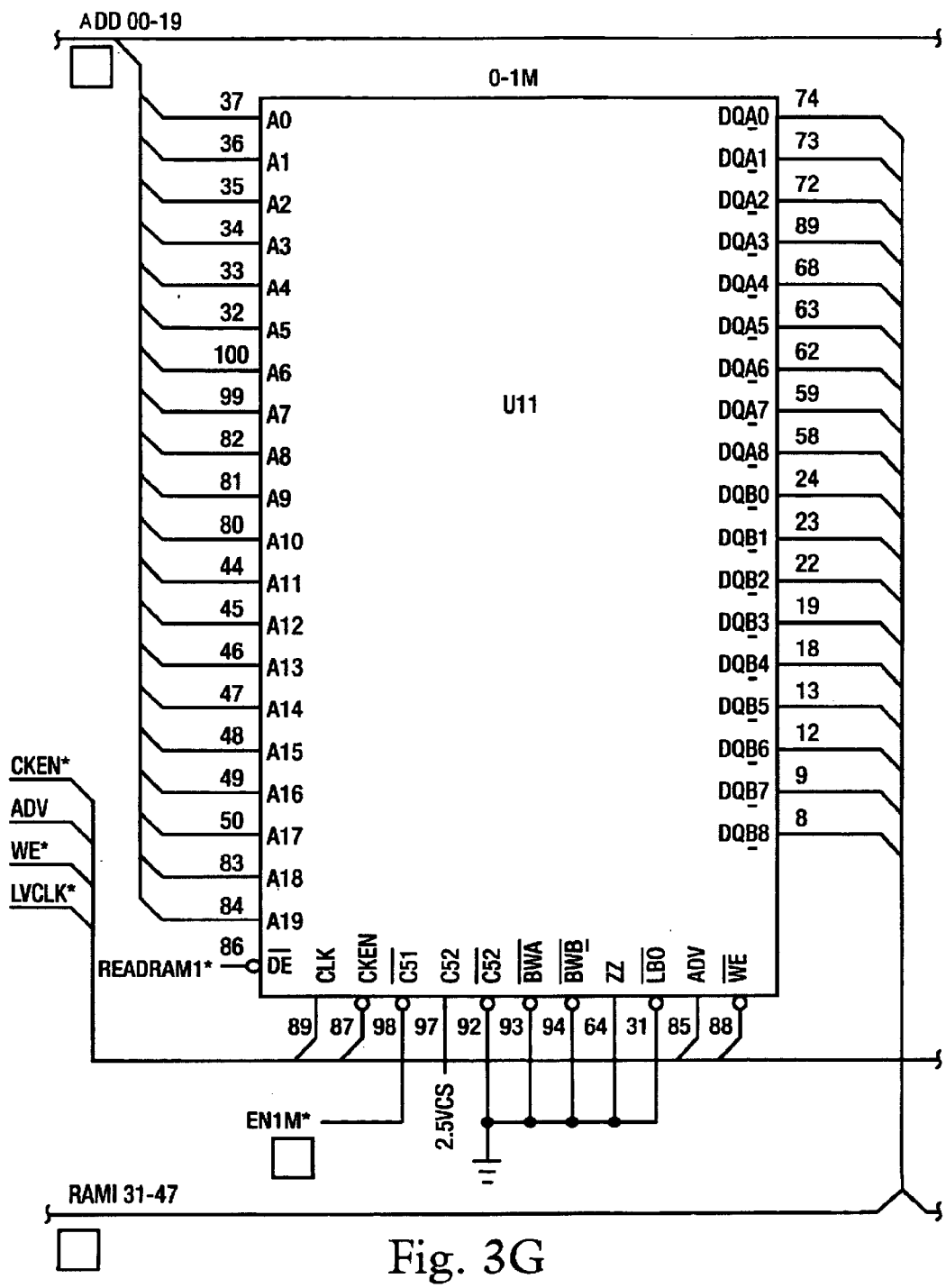
Figure 4:
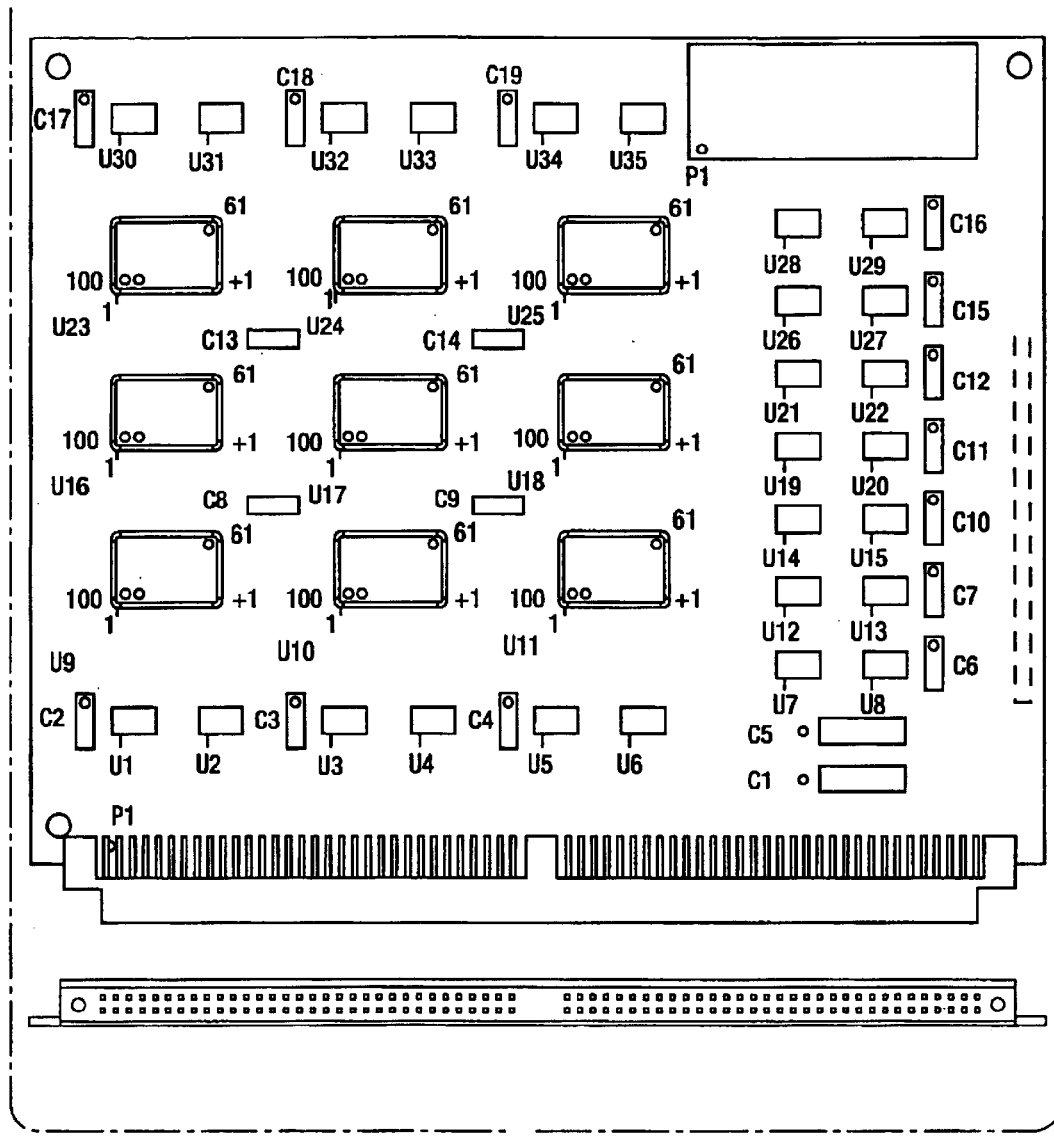
FIG. 4 is a diagram illustrating the RAM circuit card assembly layout.
Figure 5:
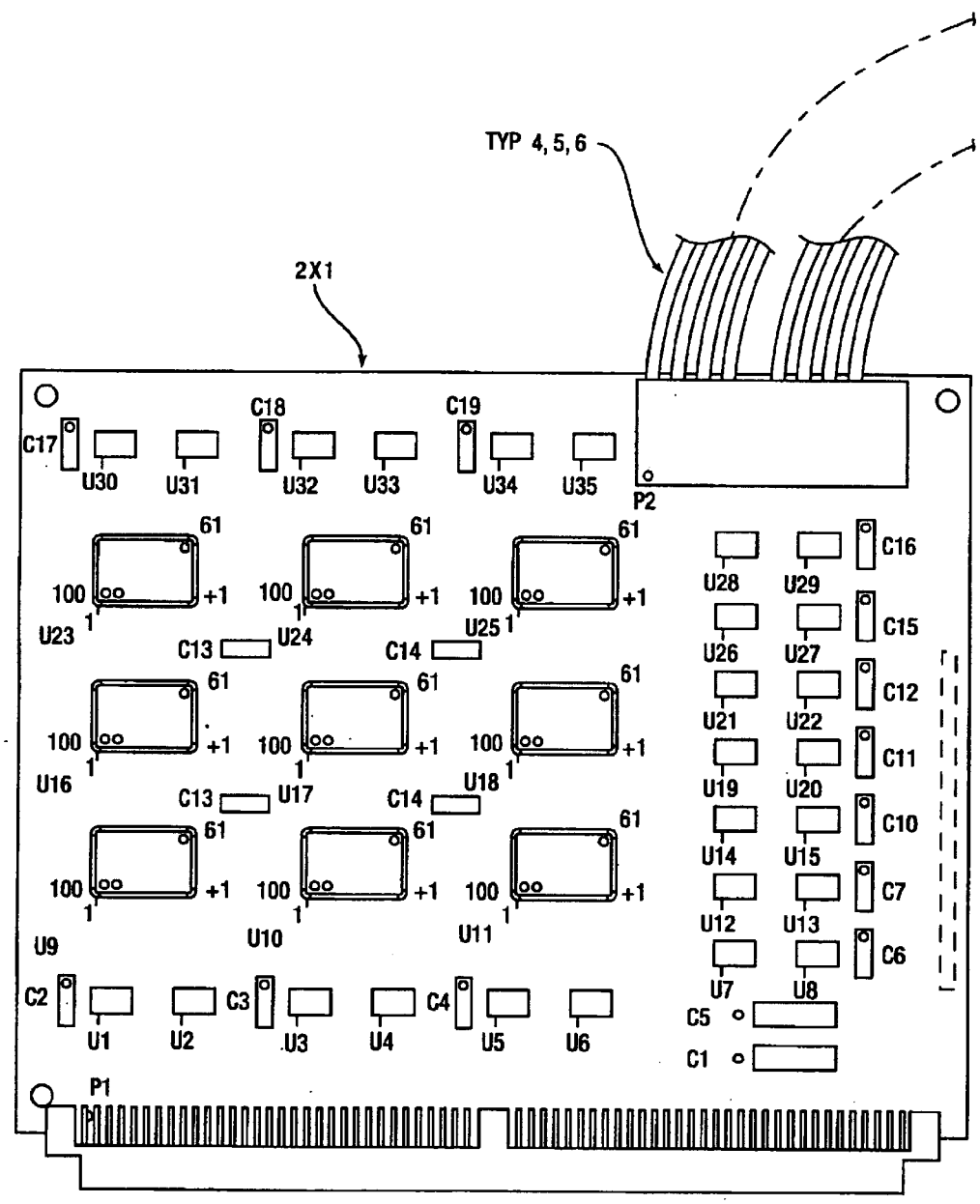
FIGS. 5–5.2 are drawings illustrating the RAM circuit card interconnections.
Figure 6A:
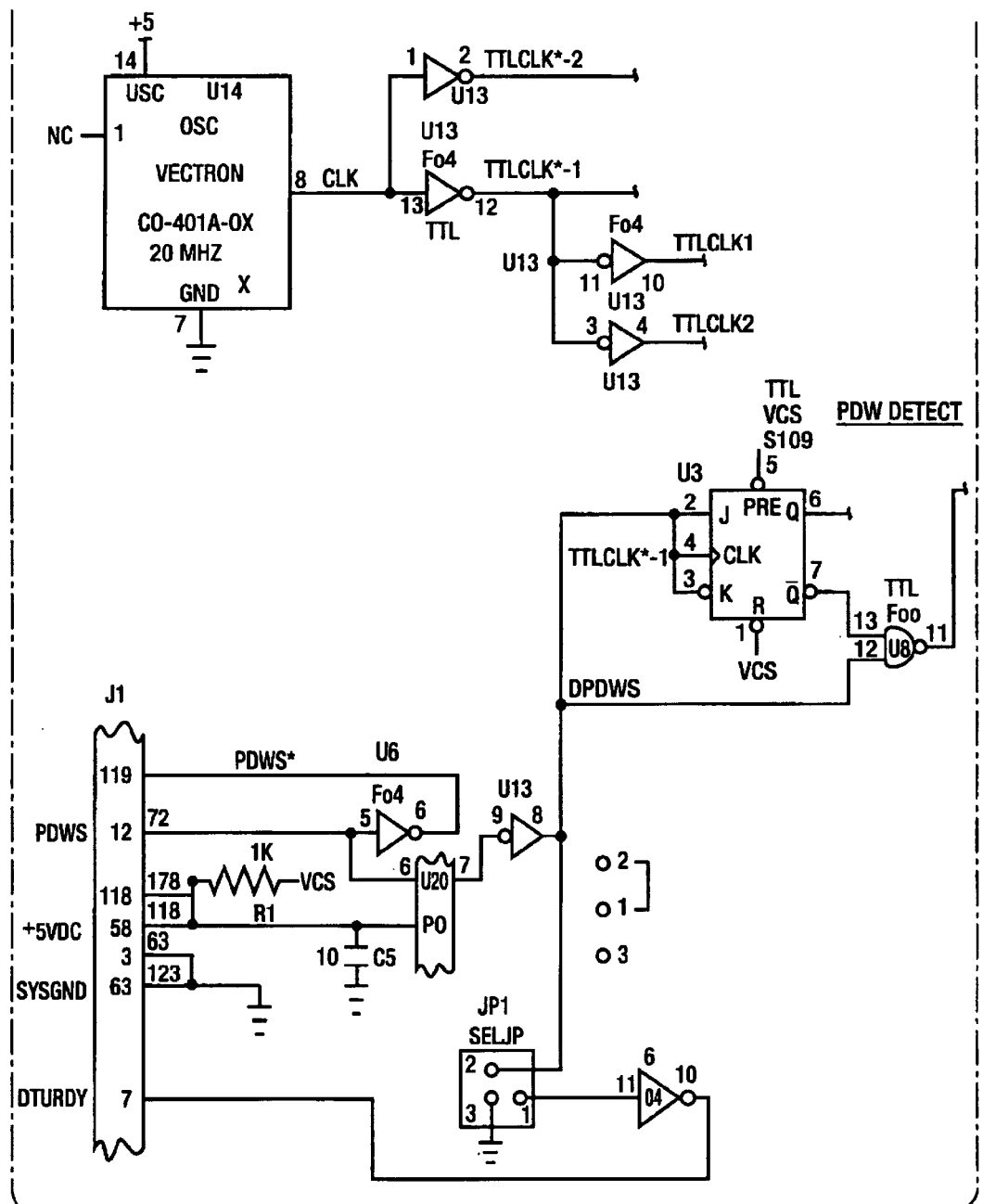
FIGS. 6A–6C.2 are detailed schematic diagrams of the RAM control circuitry.
Figure 6B:
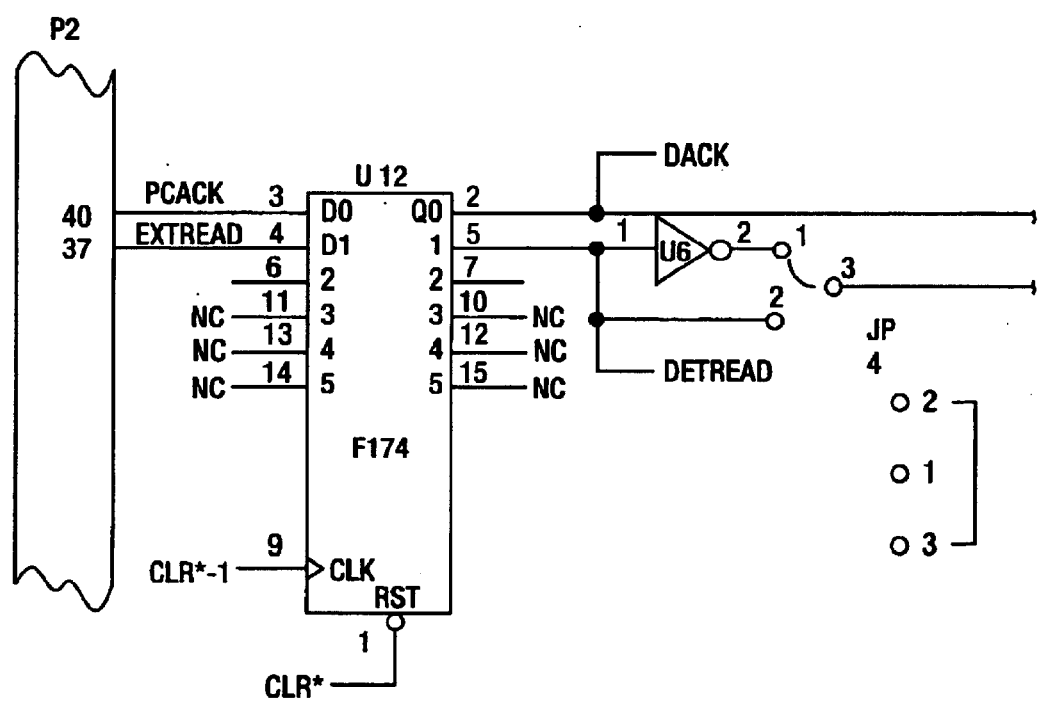
Figure 6C:
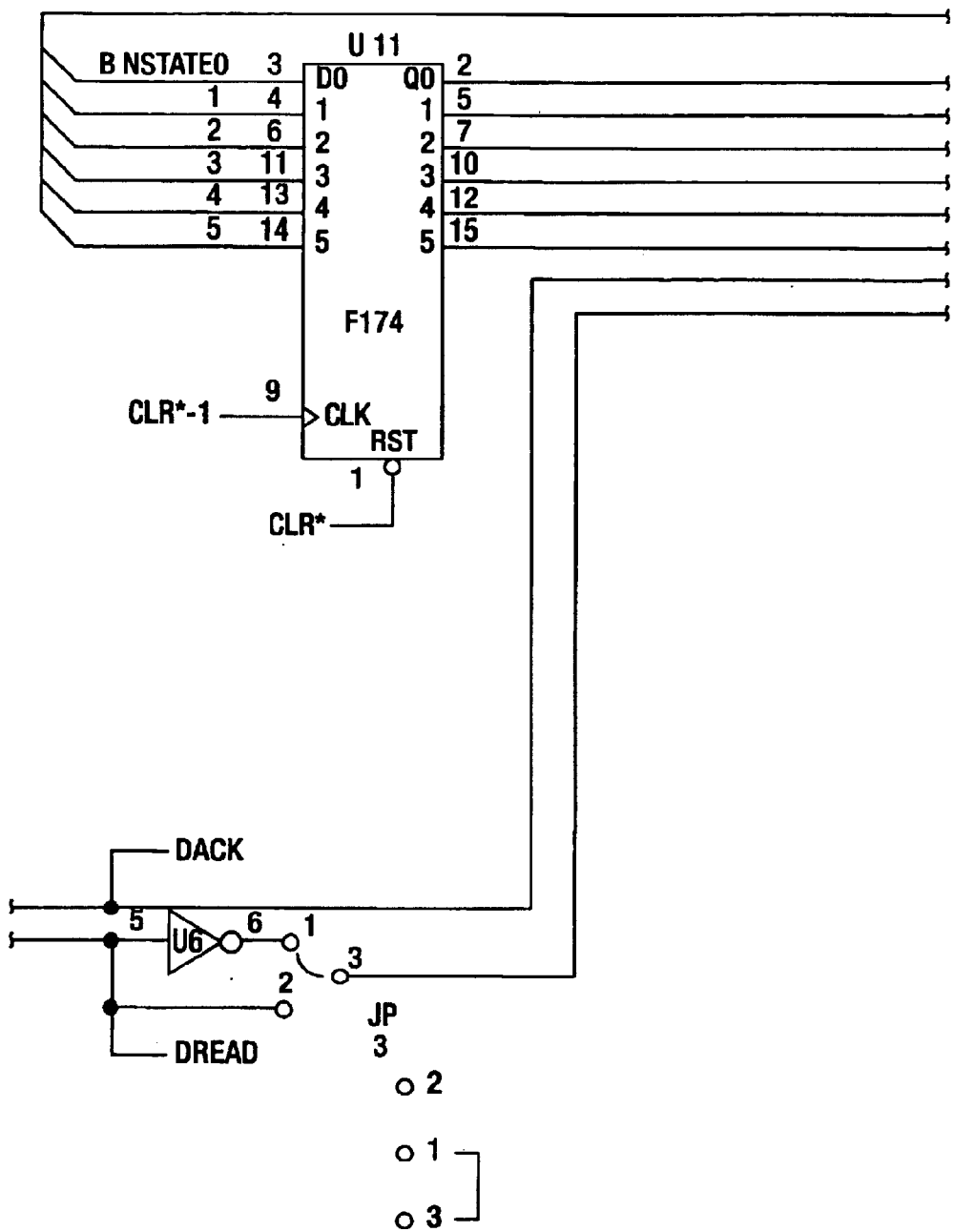
Figure 7:
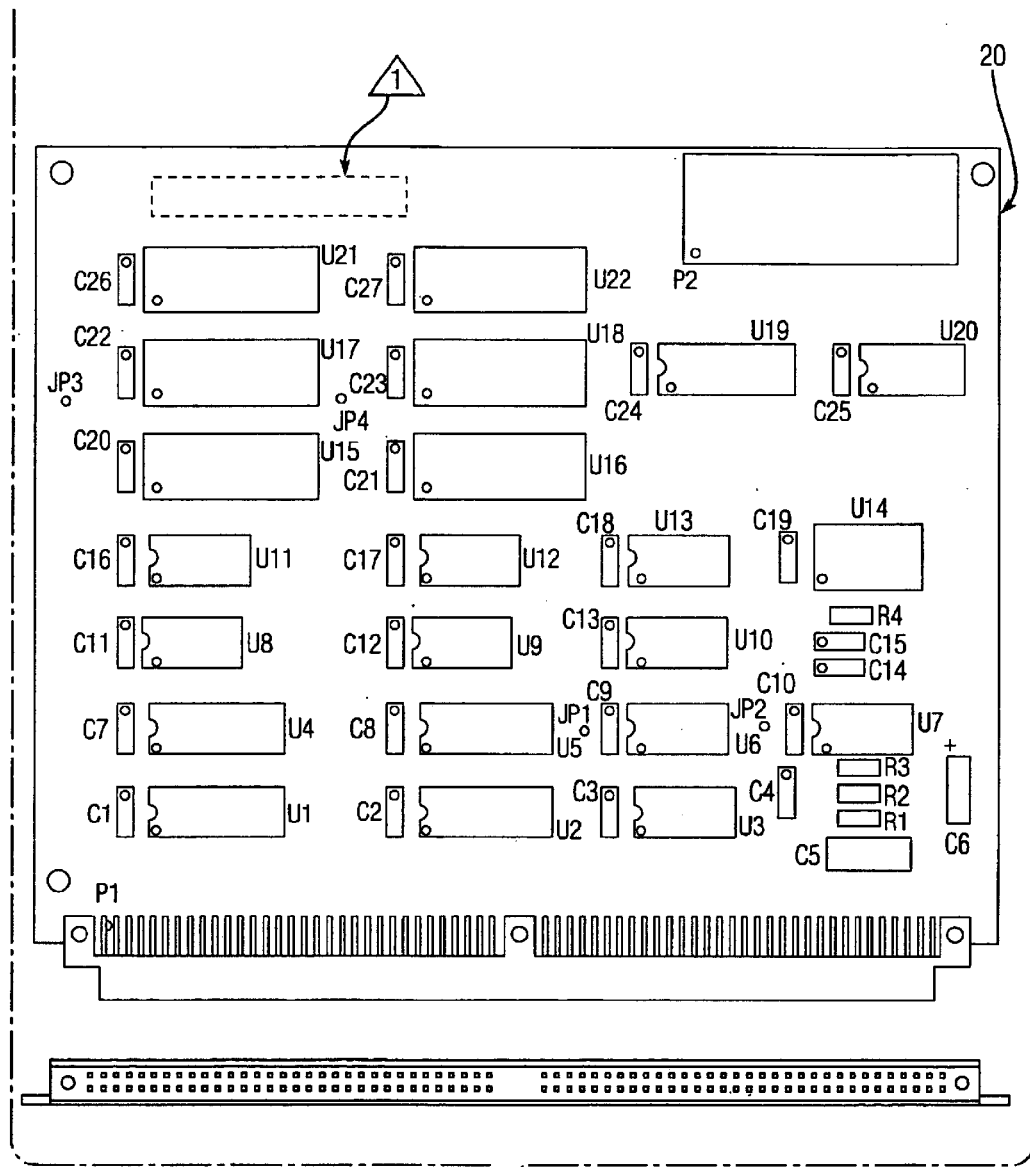
FIG. 7 is a diagram illustrating the RAM control circuit card assembly layout.

FIGS. 2–2.1 form a detailed block diagram illustrating the hardware configuration and interconnections of the pre ferred embodiment of the present invention. Referring to FIG. 2.1, using a graphical user interface (GUI) 33, supported by specially written software, a user initiates data collection via the PDW computer 20. Communication between the PDW computer 20 and the PDW extractor 10 occurs via input/output connections J6 on the PDW extractor 10 and J11 on the PDW computer 20. Multi-state sequencing programs 34 within the PDW computer 20 are designed to control the PDW extractor 10. Specifically, these sequencing programs 34 control the RAM control 15 within the PDW extractor 10 (see FIG. 1). The RAM control 15 then regulates the storage of data onto RAM circuits A and B, 21 and 22 respectively. FIGS. 3A–3G.2, 4 and 5–5.2, illustrate the RAM (21 and 22) schematics, circuit card assembly layout, and circuit card interconnections, respectively. FIGS. 6A–6C.2 and 7, illustrate the RAM control 15 schematics and circuit card assembly layout, respectively.

Referring to FIG. 2, the host ship's ES system receiver includes a starboard antenna angle encoder 23, a port antenna angle encoder 24 and a coarse frequency receiver (CFR) 25. These angle encoders produce digital word data based on both the amplitude (AMP) and the angle of arrival (AOA) of received RF signals. The starboard antenna angle encoder 23 transmits AMP and AOA PDWs via the ship's cable W35 to input J7 on the PDW extractor 10. The port antenna angle encoder 24 transmits AMP and AOA PDWs via ship's cable W36 to input J2. The CFR 25 produces PDWs based on the frequency (FREQ) of received RFs and transmits these PDWs via ship's cable 1W23 to input J3.

Once the transmitted PDWs enter the PDW extractor 10, the AMP and AOA PDWs are transmitted within the PDW extractor 10 through internal connectors J9/J10 and J10/J11/J12 to angle/amplitude boards B2 and B3, where the data is captured and held. Frequency PDWs are transmitted through internal connector J6 to the frequency formatter 14 and formatted.

Timing of all functions within the PDW extractor 10 is managed based upon a clock generator 16. The exterior front panel of the clock generator 16 has a run/load toggle switch and a push button reset which allow the user to place the extractor into operations mode or to initialize the internal sequencer. Timing alignment controls 11 on the front panel 12 of the PDW extractor 10 are adjustable by the user so that the timing of the data flow control (DFC) time coincidence 13 synchronizes the timing of the PDW extractor 10 with that of the host ship's ES system. In order to accomplish the required timing alignment, the timing alignment controls 111 cause potentiometers 31, to send voltage signals into the circuit boards holding the angle, amplitude and frequency data.

Once the timing adjustment is complete, AOA, AMP and FREQ PDWs are forwarded to the PDW buffer 17. The PDW buffer 17 is a holding register where PDW data is held until it is stable and the RAM control 15 can write the data on to the RAM memory (21 and 22). The time of arrival (TOA) 19 of each PDW into the PDW buffer 17 is monitored by the clock generator 16. PDWs are clocked in to and out of the PDW buffer 17 using a first in-first out (FiFo) control logic 18. When the PDW buffer 17 holds PDW data, it sends a strobe 35 out to the RAM control 15 (see FIG. 2.1), informing the RAM control 15 that there is data waiting to be collected.

Figure 8:
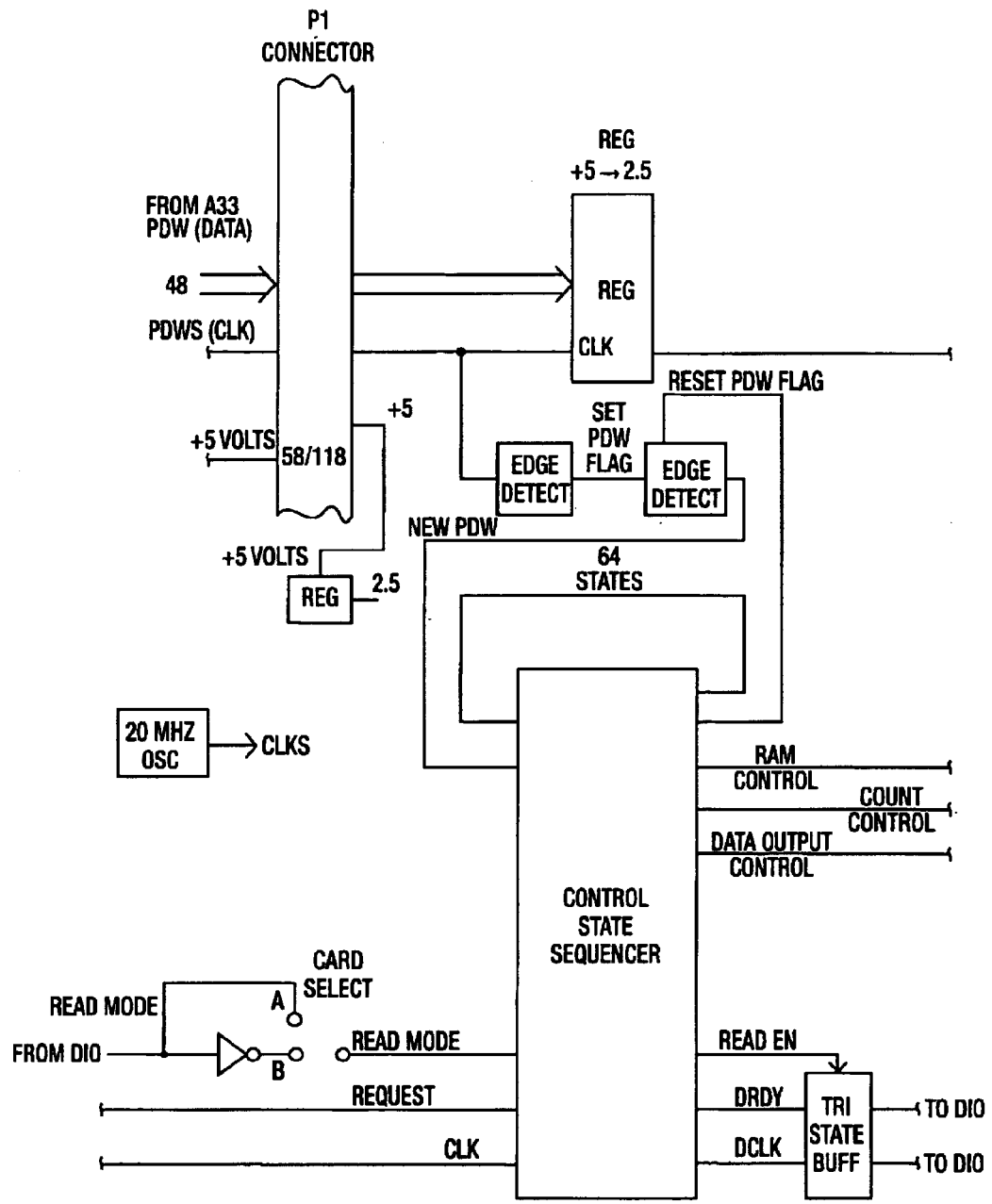
FIGS. 8–8.1 are diagrams illustrating the PDW extractor's electrical flow.
Figure 9:
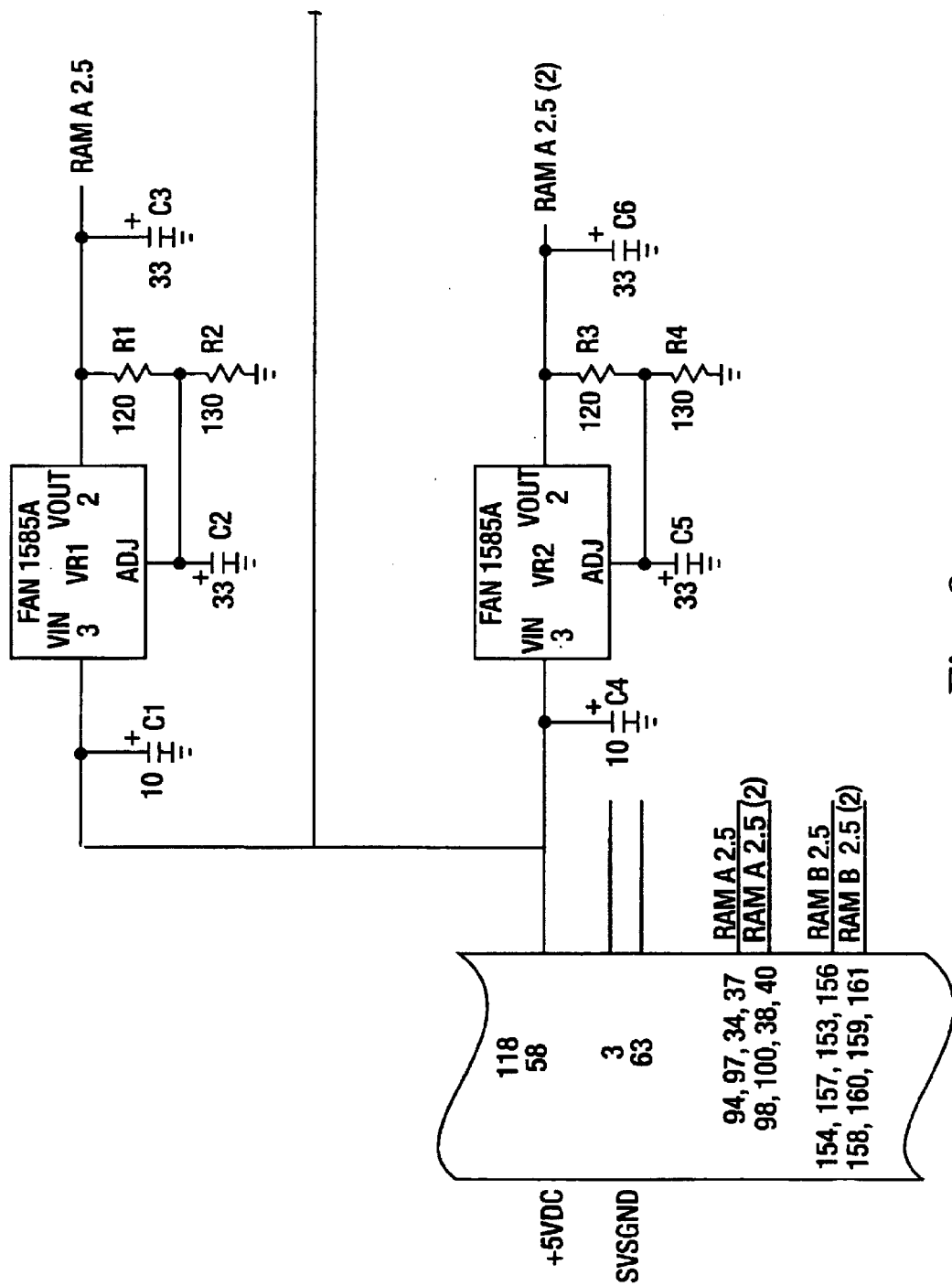
FIGS. 9–9.1 are schematic diagrams of the power supply (converter).
Figure 10:
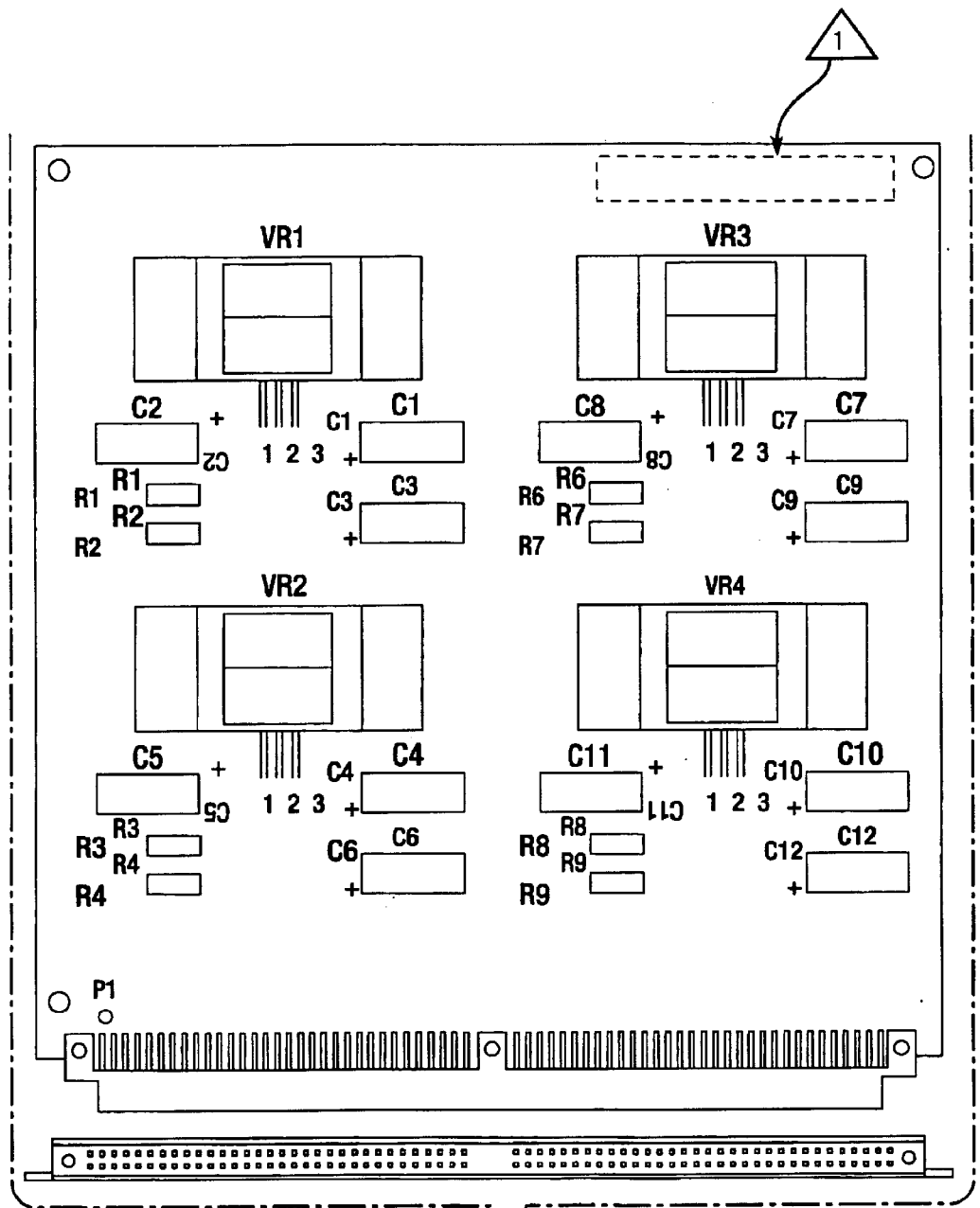
FIG. 10 is a diagram illustrating the power supply circuit card assembly layout.

Again referring to FIG. 2.1, RAM control 15 and the two high-speed integrated RAM circuits, RAM A (21) and RAM B (22), are powered by a 2.5 volt power source (PS) 32. This power source 32 contains a power converter for converting a 5 volt direct current into the required 2.5 volts. A diagram of the PDW extractor's electrical flow is presented in FIG. 8. FIGS. 9–9.1 and 10 illustrate the power converter schematics and the power converter assembly layout.

The writing of data onto RAMs A (21) and B (22) and the reading of data from RAMS A (21) and B (22) are controlled by the read/write select 42 and the read/write control 41 mechanisms of the RAM control 15 that is in turn controlled by the multi-state sequencing software 34 of the PDW computer 20. The purpose of these two RAM circuits (21 and 22) is to allow the PDW extractor 10 to write new PDW data onto one RAM (ie. 21), while at the same time reading PDW data previously stored on the other RAM (ie. 22) to the PDW computer 20. This write/read loop using two RAMs allows for continuous long-term data collection and is designed to ensure that no data is lost.

Using the GUI 33 and data management software 36 within the PDW computer 20, the user assigns a base file name to the data to be collected and initiates the data collection process. The RAM control 15 has a strobe monitor 43 for monitoring the PDW strobe 35 from the PDW buffer 17. When the PDW strobe 35 indicates to RAM control 15 that data is ready to be collected, read/write select 42 determines which RAM to write the data on to and read/write control 41 initiates the writing of PDWs onto the selected first RAM (ie. 21). As each PDW is written on to the first RAM, a write counter (37 or 39 depending on which RAM is in the write mode) is incremented to indicate how many PDWs are being stored. Writing continues onto the first RAM until an interrupt, programmed by the sequencing software 34 of the PDW computer 20, simultaneously forces the read/write select 42 to switch the first RAM circuit (21) into the read mode and the second RAM circuit (22) into the write mode. In the current embodiment of this invention, this interrupt is set at 1 second. Control to each RAM circuit is complementary. The sequencing programs 34 then read the write counter from the first RAM to determine the total number of stored pulses, and then reads that amount of stored PDW data to the PDW computer 20. A read counter (38 or 40 depending on which RAM is in the read mode) within the RAM insures that the PDW computer 20 is reading the correct number of PDWs. This read/write loop repeats at each interrupt. Lastly, the PDWs that are read to the PDW computer 20 are stored onto a RAID hard drive 37 within the PDW computer 20 for retention and later analysis.

Data management software 36 is written so that it is able to read stored PDW data from the hard drive, compact CD disk, DVD or other storage medium and format the data into usable (binary to decimal, etc) terms. During analysis the data parameters may be plotted into a variety of graphics such as, pulse frequency versus time of arrival, pulse frequency versus angle of arrival, amplitude versus angle of arrival, etc. The data management software 36 filters ranges of several parameters and stores these as spread sheet files. The data management software 36 is also able to relate the parameters in high resolution and format the files to play back in laboratory environment. Ultimately, once all the digitized RF pulse data from a selected theater of operation during a particular time period is captured, the ES system engineers can replay an entire event to monitor, assess, develop and update threat identification software.

Three multi-state sequencing programs 34, set out below, were developed for the preferred embodiment of this invention. Sequencing program 1 primarily controls the sequence of the processes within the PDW extractor 10 based upon input stimulus. Sequencing programs 2 and 3, along with sequencing program 1, control the outputs that in turncontrol data paths, write strobes, etc, all based on the "state" of the sequencer.

SEQUENCER PROGRAM 1

```
C   SET UP THE STATE FIELD
    PSTAT=A0+2*A1+4*A2+8*A3+16*A4+32*A5
C   SET UP THE INPUT CONTROL BITS
    DACK=A6
    READ=A7
    NEWPDW=A8
    GROUND=A9
    NSTAT=PSTAT
C   SET UP THE OUTPUT BITS' DEFAULT CONDITIONS
    CLKEN=1
    OERAM=1
C   SET UP THE STATES
C   SEQUENCER STARTS AT 0 AND DEPENDENT ON READ MODE GOES TD RD/WR LOO
C   READ LOOP STARTS AT 1, WR LOOP STARTS AT 32
    IF(PSTAT.EQ.0.AND.READ.EQ.1)NSTAT=1
    IF(PSTAT.EQ.0.AND.READ.EQ.0)NSTAT=32
C   WATCH FOR CHANGE OF READ STATUS AT TOP OF WRITE AND READ LOOP
C   FOLLOWING IS THE READ SEQUENCE *********
C   STORE LAST ADDRESS, CLR COUNTER, HANDSHAKE WITH DIO FOR # WORDS
    IF(PSTAT.EQ.1.AND.READ.EQ.1)NSTAT=2
    IF(PSTAT.EQ.1.AND.READ.EQ.0)NSTAT=32
    IF(PSTAT.EQ.2)NSTAT=3
    IF(PSTAT.EQ.3.AND.DACK.EQ.1)NSTAT=4
    IF(PSTAT.EQ.4)NSTAT=5
    IF(PSTAT.EQ.5.AND.DACK.EQ.1)NSTAT=6
    IF(PSTAT.EQ.6)NSTAT=7
C   SET READ ADDRESS, HANDSHAKE WITH DIO FOR PDW, INC READ ADDRESS
    IF(PSTAT.EQ.7)NSTAT=8
    IF(PSTAT.EQ.8)NSTAT=9
    IF(PSTAT.EQ.9)NSTAT=10
    IF(PSTAT.EQ.10.AND.DACK.EQ.1)NSTAT=11
    IF(PSTAT.EQ.11)NSTAT=12
    IF(PSTAT.EQ.12.AND.DACK.EQ.1)NSTAT=13
    IF(PSTAT.EQ.13)NSTAT=14
    IF(PSTAT.EQ.14.AND.DACK.EQ.1)NSTAT=15
    IF(PSTAT.EQ.15)NSTAT=16
    IF(PSTAT.EQ.16)NSTAT=8
C   START WRITE SEQUENCE
    IF(PSTAT.EQ.32.AND.READ.EQ.1)NSTAT=1
    IF(PSTAT.EQ.32.AND.NEWPDW.EQ.1)NSTAT=33
    IF(PSTAT.EQ.33)NSTAT=34
    IF(PSTAT.EQ.34)NSTAT=35
    IF(PSTAT.EQ.35)NSTAT=36
    IF(PSTAT.EQ.36)NSTAT=37
    IF(PSTAT.EQ.37.AND.NEWPDW.EQ.1)NSTAT=33
C   CHECK FOR CHANGED READ MODE IF SO GOTO 0
    IF(PSTAT.EQ.3.AND.READ.EQ.0)NSTAT=32
    IF(PSTAT.EQ.5.AND.READ.EQ.0)NSTAT=32
    IF(PSTAT.EQ.8.AND.READ.EQ.0)NSTAT=32
    IF(PSTAT.EQ.10.AND.READ.EQ.0)NSTAT=32
    IF(PSTAT.EQ.12.AND.READ.EQ.0)NSTAT=32
    IF(PSTAT.EQ.14.AND.READ.EQ.0)NSTAT=32
C   CHECK FOR CHANGED READ MODE IF SO GOTO 0
    IF(PSTAT.EQ.37.AND.READ.EQ.1)NSTAT=1
C   SET UP CONTROL BITS VS. STATE
C   READ
    IF(PSTAT.EQ.8)CLKEN=0     clockenable clken is used for rams
    IF(PSTAT.EQ.9)CLKEN=0
    IF(PSTAT.EQ.10)CLKEN=0
    IF(PSTAT.EQ.10)OERAM=0    output enable ram oeram allows the ramoutput
C   WRITE
    IF(PSTAT.EQ.33)CLKEN=0
    IF(PSTAT.EQ.34)CLKEN=0
    IF(PSTAT.EQ.35)CLKEN=0
C   SET UP CONTROL BIT POSITIONS
    DATA=NSTAT+64*CLKEN+128*OERAM
```

SEQUENCER PROGRAM 2

```
PSTAT=A0+2*A1+4*A2+8*A3+16*A4+32*A5
ADV=0     advance counter
WE=1      write enable into ram
STRADD=0  store address of last pdw
```

| SEQUENCER PROGRAM 2 | |
|---|---|
| CLRPDW=1 | clear pdw ready flag |
| INCCNT=0 | increment counter |
| CLRCNT=1 | clear counter to zero |
| ADDOE1=1 | address counter output enable to pc |
| ADDOE2=1 | address counter output enable to pc |
| IF(PSTAT.EQ.33)WE=0 | |
| IF(PSTAT.EQ.34)WE=0 | |
| IF(PSTAT.EQ.35)WE=0 | |
| IF(PSTAT.EQ.1)STRADD=1 | |
| IF(PSTAT.EQ.0)CLRPDW=0 | |
| IF(PSTAT.EQ.36)CLRPDW=0 | |
| IF(PSTAT.EQ.16)INCCNT=1 | |
| IF(PSTAT.EQ.36)INCCNT=1 | |
| IF(PSTAT.EQ.0)CLRCNT=0 | |
| IF(PSTAT.EQ.2)CLRCNT=0 | |
| IF(PSTAT.EQ.32)CLRCNT=0 | |
| IF(PSTAT.EQ.4)ADDOE1=0 | |
| IF(PSTAT.EQ.6)ADDOE2=0 | |
| DATA=ADV+2*WE+4*STRADD+8*CLRPDW+16*INCCNT+32*CLRCNT+64*ADDOE1 &+128*ADDOE2 | |

| SEQUENCER PROGRAM 3 | |
|---|---|
| PSTAT=A0+2*A1+4*A2+8*A3+16*A4+32*A5 | |
| C   SET UP INPUT CONTROL BIT POSITIONS | |
| C   SET UP THE OUTPUT BITS' DEFAULT | |
|    OE1=1 | enable output data to pc |
|    OE2=1 | enable output data to pc |
|    OE3=1 | enable output data to pc |
|    PCLK=0 | clock data to pc |
|    DIRQST=0 | request pc get data |
|    BUFFEN=1 | output data buffer enable |
|    READEN=1 | enable reading |
|    OUTCLK=0 | clock to pc |
| C   SET UP THE CONTROL BITS VS STATE | |
|    IF(PSTAT.EQ.11)OE1=0 | |
|    IF(PSTAT.EQ.13)OE2=0 | |
|    IF(PSTAT.EQ.15)OE3=0 | |
|    IF(PSTAT.EQ.3)PCLK=1 | |
|    IF(PSTAT.EQ.4)PCLK=1 | |
|    IF(PSTAT.EQ.6)PCLK=1 | |
|    IF(PSTAT.EQ.10)PCLK=1 | |
|    IF(PSTAT.EQ.11)PCLK=1 | |
|    IF(PSTAT.EQ.13)PCLK=1 | |
|    IF(PSTAT.EQ.15)PCLK=1 | |
|    IF(PSTAT.EQ.3)DIRQST=1 | |
|    IF(PSTAT.EQ.4)DIRQST=1 | |
|    IF(PSTAT.EQ.5)DIRQST=1 | |
|    IF(PSTAT.EQ.6)DIRQST=1 | |
|    IF(PSTAT.EQ.7)DIRQST=1 | |
|    IF(PSTAT.EQ.8)DIRQST=1 | |
|    IF(PSTAT.EQ.9)DIRQST=1 | |
|    IF(PSTAT.EQ.10)DIRQST=1 | |
|    IF(PSTAT.EQ.11)DIRQST=1 | |
|    IF(PSTAT.EQ.12)DIRQST=1 | |
|    IF(PSTAT.EQ.13)DIRQST=1 | |
|    IF(PSTAT.EQ.14)DIRQST=1 | |
|    IF(PSTAT.EQ.15)DIRQST=1 | |
|    IF(PSTAT.EQ.16)DIRQST=1 | |
|    IF(PSTAT.EQ.4)BUFFEN=0 | |
|    IF(PSTAT.EQ.6)BUFFEN=0 | |
|    IF(PSTAT.EQ.11)BUFFEN=0 | |
|    IF(PSTAT.EQ.13)BUFFEN=0 | |
|    IF(PSTAT.EQ.15)BUFFEN=0 | |
|    IF(PSTAT.EQ.1)READEN=0 | |
|    IF(PSTAT.EQ.2)READEN=0 | |
|    IF(PSTAT.EQ.3)READEN=0 | |
|    IF(PSTAT.EQ.4)READEN=0 | |
|    IF(PSTAT.EQ.5)READEN=0 | |
|    IF(PSTAT.EQ.6)READEN=0 | |
|    IF(PSTAT.EQ.7)READEN=0 | |

-continued

SEQUENCER PROGRAM 3

```
IF(PSTAT.EQ.8)READEN=0
IF(PSTAT.EQ.9)READEN=0
IF(PSTAT.EQ.10)READEN=0
IF(PSTAT.EQ.11)READEN=0
IF(PSTAT.EQ.12)READEN=0
IF(PSTAT.EQ.13)READEN=0
IF(PSTAT.EQ.14)READEN=0
IF(PSTAT.EQ.15)READEN=0
IF(PSTAT.EQ.16)READEN=0
IF(PSTAT.EQ.10)OUTCLK=1
DATA=1*OE1+2*OE2+4*OE3+8*PCLK+16*DIRQST+32*BUFFEN+64*READEN
&+128*OUTCLK
```

Figure 11:
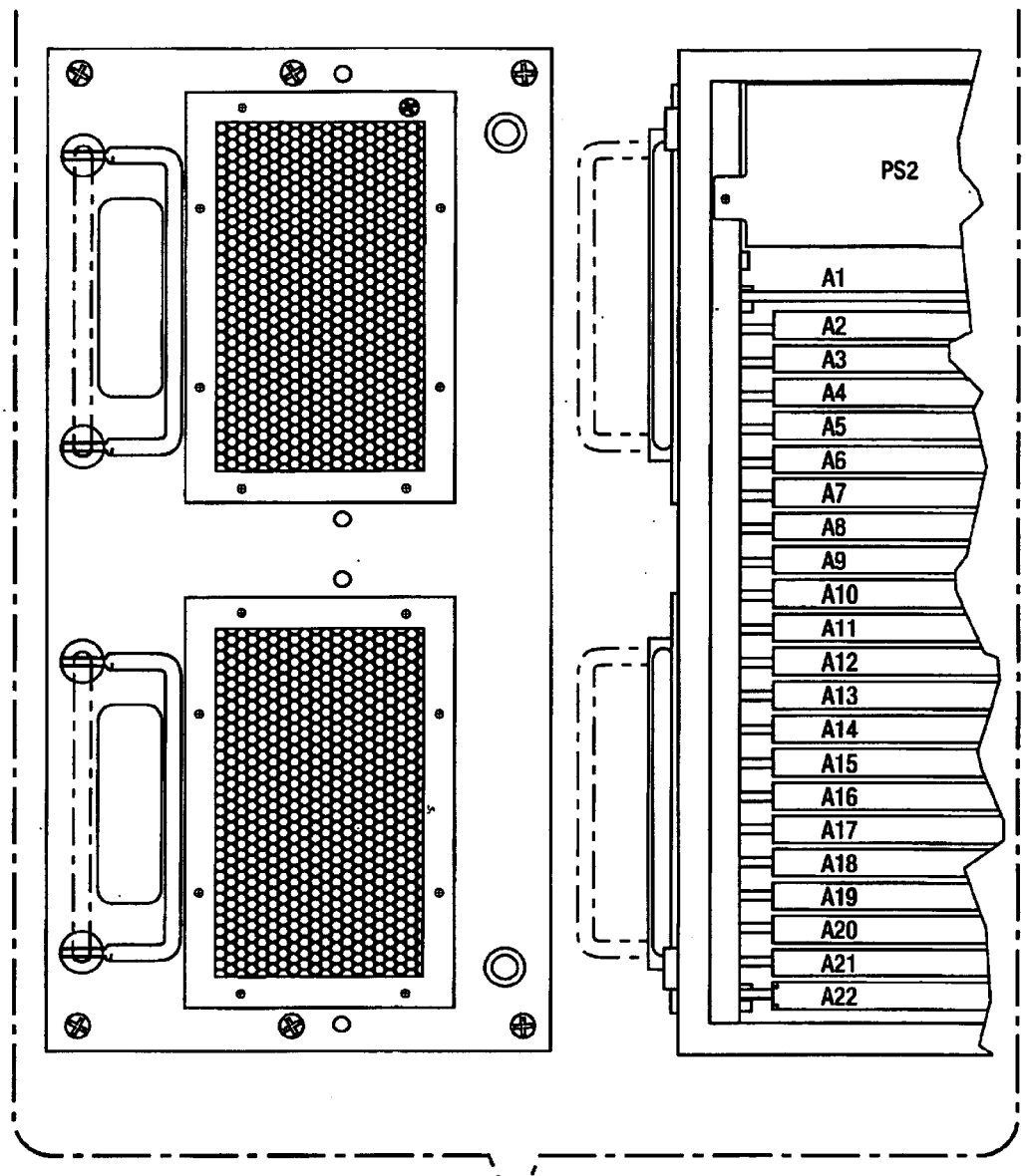
FIGS. 11–11.1 is a drawing illustrating the PDW extractor's internal harnessing.

FIGS. 11–11.1 form a drawing illustrating the PDW extractor's internal harnessing.

FIG. 12 is a drawing illustrating the PDW extractor's exterior mechanical assembly.

Figure 13:
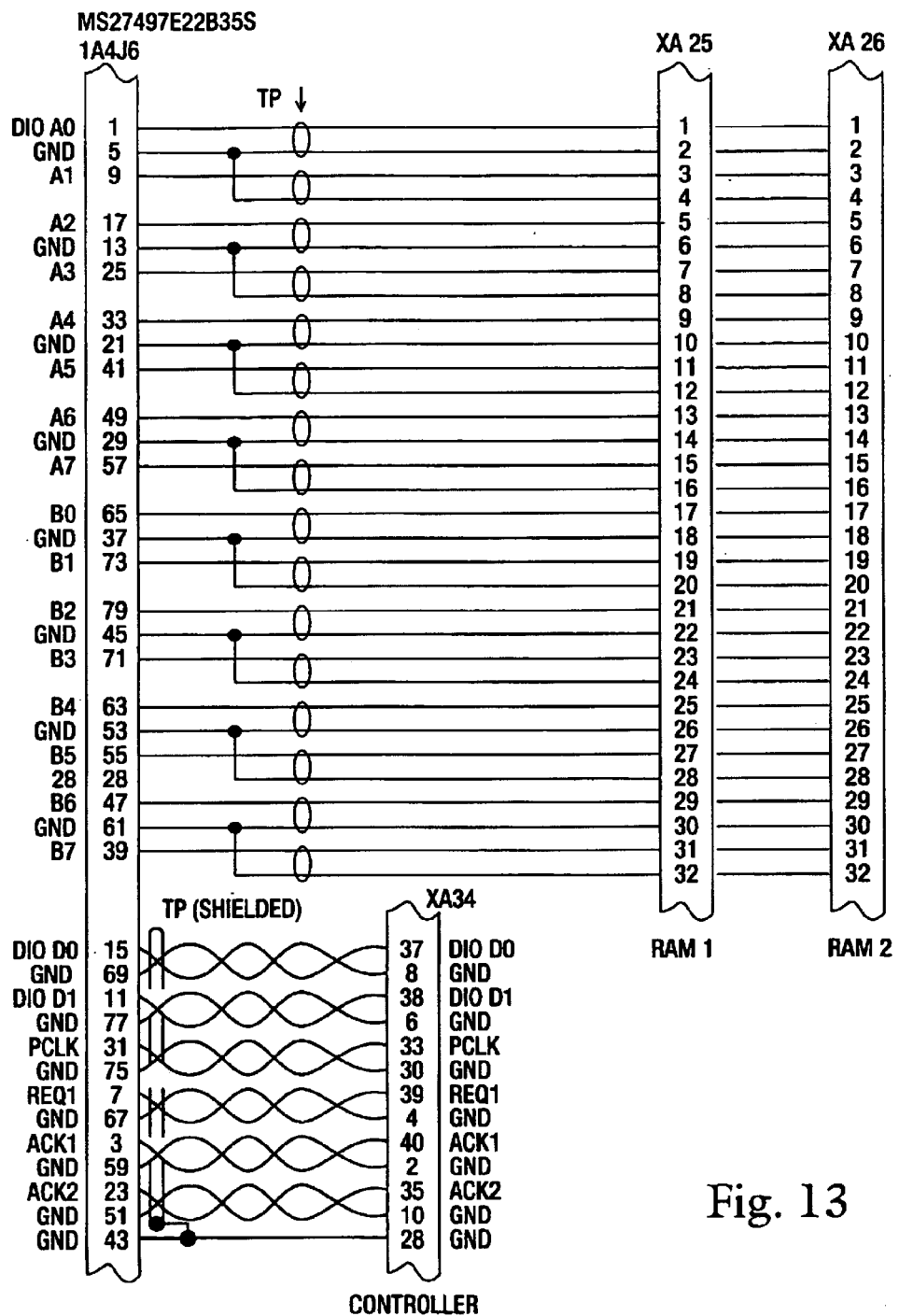
FIG. 13 is a diagram illustrating the interface between the PDW extractor and the PDW computer.

FIG. 13 is a diagram illustrating the connector interface between the PDW extractor and the PDW computer.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. In an electronic surveillance system having a receiver for receiving radio frequency pulse signals and for converting said radio frequency pulse signals into digitized radio frequency pulse descriptor word data and a presorter connected down-circuit of said receiver for further processing of digitized radio frequency pulse descriptor word data forwarded from the receiver, a pulse descriptor word (PDW) collector, comprising:

a memory storage and a PDW extractor circuit for collecting all digitized radio frequency pulse descriptor word data received by said electronic surveillance system wherein said PDW extractor circuit is integrated into said electronic surveillance system at a point located between said receiver and said presorter; said PDW extractor circuit capturing said data and storing it into random access memory (RAM) while simultaneously allowing said data to flow unaltered and uninterrupted through said extractor to said presorter.

2. A pulse descriptor word collector as in claim 1, wherein said RAM transfers said data to said memory storage for later retreival.

3. A pulse descriptor word collector as in claim 2, wherein said collector is portable and may be removed to a laboratory setting for said play back and analysis.

4. A pulse descriptor word collector as in claim 1, further comprising a personal computer coupled to said PDW extractor circuit, said personal computer including sequencing software to control the collecting of digitized radio frequency pulse descriptor word.

5. A pulse descriptor word collector as in claim 3, wherein said personal computer further comprises graphical user interface software giving the user point and click control to initiate and manage data collection.

6. A pulse descriptor word collector as in claim 1, wherein said electronic surveillance system is of a type having threat identification capabilities and said data is stored long-term in said personal computer so that said data may be played back for monitoring and assessment.

7. A pulse descriptor word collector as in claim 1, wherein said memory storage is comprised of Redundant Array of Independent Disks (RAID) hard drives.

8. A pulse descriptor word collector as in claim 1, wherein said extractor further comprises:
    (a) input/out put connections for communication with said receiver, said presorter and said personal computer;
    (b) timing alignment means and data flow control time coincidence for synchronizing the timing of data collection within said extractor with that of said electronic surveillance system;
    (c) pulse descriptor word buffer for holding incoming pulse descriptor word data captured by said extractor from said electronic surveillance system until said incoming data is stable and ready to be stored by said extractor; said buffer using a first in first out control logic; said buffer also comprising a strobe for indicating that incoming data is ready to be stored;
    (d) a random access memory (RAM) control connected to two RAM circuits; said RAM control and RAM circuits in communication with both said personal computer and said buffer; said RAM control controlled by said multi-state sequencing software of said personal computer and comprising a strobe monitor, a read/write select and a read/write control; said two RAM circuits for storing said data until it is ready to be stored by said personal computer; said two RAM circuits complimentary to each other such that when one is in a write mode, the other is in a read mode; said strobe monitor for monitoring said strobe from said buffer; said read/write control controlling a process of writing data from the buffer on one RAM while reading from the other RAM to the personal computer; said read/write select switching said RAM circuits back and forth between read and write modes; said two RAM circuits each further comprising a read counter and a write counter for monitoring the quantity of data that is being written to or read from said RAM circuits.

9. A pulse descriptor word collector as in claim 8, wherein said multi-state sequencing software is programmed with an interrupt; said interrupt programmed to cause the read/write select within the RAM control to switch said RAM circuits from write to read and vice versa at a predetermined interval.

10. A pulse descriptor word collector as in claim 1, for use as a referee receiver for independently verifying signals received by the host electronic surveillance system.

11. In an electronic surveillance system having a receiver connected to a presorter, wherein the receiver receives radio frequency pulse signals, converts the said radio frequency pulse signals into digitized radio frequency pulse descriptor word data and then forwards said digitized radio frequency pulse descriptor word data to the presorter for further processing; a method for passively collecting all digitized radio frequency pulse descriptor word data while simultaneously allowing said data to flow unaltered and uninterrupted through said extractor to said presorter, said method comprising:

(a) capturing all of said pulse descriptor word data forwarded from said receiver to said presorter;

(b) simultaneously storing said data and allowing said data to flow unaltered and uninterrupted from said receiver through to said presorter;

(c) continuously storing said data by establishing a read/write loop using two RAM circuits and a personal computer; said RAM circuits being complimentary to each other such that when one RAM circuit is in a read mode, the other RAM circuit is in a write mode and vice versa; said read/write loop is established when captured data is written onto a RAM in the write mode, while data, previously written onto the RAM that is currently in the read mode, is read to said computer and stored into long-term digital memory, then at a predetermined interrupt the RAM circuits switch modes; said read/write loop ensuring that none of the captured data is lost.

12. The method of claim 11, further comprising: analyzing said collected data in a laboratory setting to monitor, assess and update the threat identification capabilities of said electronic surveillance system.

* * * * *